United States Patent
Kwon et al.

(10) Patent No.: US 8,027,004 B2
(45) Date of Patent: Sep. 27, 2011

(54) LIQUID CRYSTAL DISPLAY

(75) Inventors: Ji-Hyun Kwon, Asan-si (KR);
Byoung-Sun Na, Suwon-si (KR);
Dong-Hyeon Ki, Cheonan-si (KR);
Soon-Il Ahn, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 241 days.

(21) Appl. No.: 11/881,382

(22) Filed: Jul. 25, 2007

(65) Prior Publication Data
US 2008/0049160 A1 Feb. 28, 2008

(30) Foreign Application Priority Data
Jul. 26, 2006 (KR) .................. 10-2006-0070291

(51) Int. Cl.
*G02F 1/1343* (2006.01)
(52) U.S. Cl. .......................... 349/139; 349/143
(58) Field of Classification Search .................. 349/139, 349/143, 149
See application file for complete search history.

(56) References Cited

U.S. PATENT DOCUMENTS

| | | | |
|---|---|---|---|
| 6,738,120 B1* | 5/2004 | Song et al. ................. | 349/139 |
| 6,970,220 B2 | 11/2005 | Park et al. | |
| 2002/0033927 A1* | 3/2002 | Mun et al. ................. | 349/156 |
| 2004/0135147 A1* | 7/2004 | Kim et al. ................. | 257/59 |
| 2004/0207790 A1* | 10/2004 | Song et al. ................. | 349/139 |
| 2005/0219452 A1 | 10/2005 | Chen et al. | |
| 2005/0231671 A1* | 10/2005 | Jun et al. ................. | 349/139 |
| 2006/0059837 A1* | 3/2006 | Ahn et al. ................. | 52/588.1 |
| 2006/0114402 A1* | 6/2006 | Lyu et al. ................. | 349/143 |
| 2006/0227274 A1* | 10/2006 | Do et al. ................. | 349/139 |
| 2007/0035685 A1* | 2/2007 | Yoshida et al. ................. | 349/139 |

FOREIGN PATENT DOCUMENTS

| | | |
|---|---|---|
| JP | 2002-40433 | 2/2002 |
| JP | 2004-310105 | 11/2004 |
| JP | 2005-49907 | 2/2005 |
| JP | 2005-165336 | 6/2005 |
| JP | 2005-242353 | 9/2005 |
| JP | 2005-338198 | 12/2005 |
| KR | 2001-0039261 | 5/2001 |
| KR | 10-0345961 | 7/2002 |
| KR | 10-0354906 | 9/2002 |

(Continued)

OTHER PUBLICATIONS

Patent Abstracts of Japan, Publication No. 2002-040433, Feb. 6, 2002, 1 p.

(Continued)

*Primary Examiner* — David Nelms
*Assistant Examiner* — Robert Tavlykaev
(74) *Attorney, Agent, or Firm* — Innovation Counsel LLP

(57) ABSTRACT

A liquid crystal display according to an embodiment of the invention includes a substrate, a plurality of gate lines formed on the substrate, a plurality of data lines formed on the substrate to intersect the gate lines, and a plurality of pixel electrodes formed on the substrate. In the liquid crystal display, the pixel electrode includes a first main side substantially parallel with the gate line, a second main side substantially parallel with the data line, a first oblique side making a first oblique angle with respect to the first and second main sides, and a second oblique side making a second oblique angle with respect to the first and second main sides. The first oblique angle and the second oblique angle are different from each other.

11 Claims, 21 Drawing Sheets

FOREIGN PATENT DOCUMENTS

| | | |
|---|---|---|
| KR | 2004-0027215 | 4/2004 |
| KR | 2005-0079070 | 8/2005 |
| KR | 2005-0111867 | 11/2005 |
| WO | WO 03/096113 A1 * | 11/2003 |

OTHER PUBLICATIONS

Patent Abstracts of Japan, Publication No. 2004-310105, Nov. 4, 2004, 1 p.

Patent Abstracts of Japan, Publication No. 2005-049907, Feb. 24, 2005, 1 p.

Patent Abstracts of Japan, Publication No. 2005-165336, Jun. 23, 2005, 2 pp.

Patent Abstracts of Japan, Publication No. 2005-242353, Sep. 8, 2005, 1 p.

Patent Abstracts of Japan, Publication No. 2005-338198, Dec. 8, 2005, 1 p.

Korean Patent Abstracts, Publication No. 1020010039261, May 15, 2001, 1 p.

Korean Patent Abstracts, Publication No. 100345961, Jul. 12, 2002, 1 p.

Korean Patent Abstracts, Publication No. 100354906, Sep. 18, 2002, 1 p.

Korean Patent Abstracts, Publication No. 1020040027215, Apr. 1, 2004, 2 pp.

Korean Patent Abstracts, Publication No. 1020050079070, Aug. 9, 2005, 1 p.

Korean Patent Abstracts, Publication No. 1020050111867, Nov. 29, 2005, 1.

* cited by examiner

LIQUID CRYSTAL DISPLAY

CROSS-REFERENCE TO RELATED APPLICATION

This application claims priority to and the benefit of Korean Patent Application No. 10-2006-0070291 filed in the Korean Intellectual Property Office on Jul. 26, 2006, the entire contents of which are incorporated herein by reference.

TECHNICAL FIELD

The present invention relates to a liquid crystal display.

BACKGROUND

A liquid crystal display is one of numerous types of flat panel displays that are being widely used. A typical liquid crystal display includes two display panels having corresponding electric field generating electrodes such as pixel electrodes and a common electrode formed thereon, and a liquid crystal layer interposed therebetween. When a voltage is applied to the electric field generating electrodes, an electric field is generated in the liquid crystal layer. The electric field determines the alignment of liquid crystal molecules of the liquid crystal layer, which controls the polarization of incident light. In this way, images are displayed.

The liquid crystal display further includes switching elements connected to individual pixel electrodes, and a plurality of signal lines such as gate lines and data lines for controlling the switching elements to apply a voltage to the pixel electrodes.

Among the various types of liquid crystal displays, a longitudinally-aligned-mode liquid crystal display is popular because it has a high contrast ratio and a wide reference viewing angle. In the longitudinally-aligned-mode liquid crystal display, when no electric field is applied, the major axis of each liquid crystal molecule is aligned to be longitudinal to a display panel.

Specific methods of realizing a wide viewing angle in the longitudinally-aligned-mode liquid crystal display include a method of forming cutouts in electric field generating electrodes and a method of forming protrusions on electric field generating electrodes. The cutouts and the protrusions determine the tilt directions of the liquid crystal molecules. Therefore, when the cutouts and the protrusions are suitably disposed so as to disperse the tilt directions of the liquid crystal molecules in various directions, it is possible to achieve the wide reference viewing angle.

In such a liquid crystal display, in order to raise luminance, the strength of the electric field formed in the liquid crystal layer may be increased. However, when an applied voltage to the pixel electrodes is raised in order to increase the strength of the electric field, the electric field formed between the pixel electrodes and the data lines for transmitting the voltage to be applied to the pixel electrodes also becomes stronger. This strong electric field disorders the alignment of the liquid crystal molecules positioned around the pixel electrode edges, increasing the response time of the liquid crystal.

Meanwhile, since it is difficult for light to pass through portions where the protrusions or the cutouts exist, the more protrusions or cutouts, the lower the aperture ratio. However, when the separation between the protrusions or the cutouts increases in order to raise the aperture ratio, the effects of the protrusions or the cutouts are relatively decreased and disturbance in the electric field due to the data lines becomes severe, thus increasing the response time.

In a rectangular liquid crystal display in which pixel electrodes are parallel with gate lines and data lines, an electric field generated between neighboring pixel electrodes disorders the alignment of liquid crystal molecules. As a result, a texture is generated. Accordingly, the transmittance is decreased and a residual image remains on a screen.

In order to reduce such texture, a cutout of a common electrode may overlap a side of a pixel electrode. However, the aperture ratio may be lowered, which may have the undesirable effect of reducing transmittance.

SUMMARY

In accordance with the present invention, a liquid crystal display is disclosed that may provide certain advantages of increasing aperture ratio and a transmittance, and possibly reducing residual images.

A liquid crystal display according to an embodiment of the invention includes: a substrate; a plurality of gate lines formed on the substrate; a plurality of data lines formed on the substrate so as to intersect the gate lines; and a plurality of pixel electrodes formed on the substrate. In the liquid crystal display, the pixel electrode includes: a first main side substantially parallel with the gate line; a second main side substantially parallel with the data line; a first oblique side making a first oblique angle with respect to the first and second main sides; and a second oblique side making a second oblique angle with respect to the first and second main sides. The first oblique angle and the second oblique angle are different from each other.

An angle formed between the first main side and the second oblique side may be in the range of 0° to 45°, and an angle formed between the second oblique side and the first oblique side may be in the range of 0° to 45°.

The first main side, the second oblique side, the first oblique side, and the second main side may be sequentially adjacent to one another.

The second oblique side may be adjacent to the gate line.

The liquid crystal display may further include a common electrode facing the pixel electrodes, and the common electrode may have a first cutout formed substantially parallel with the first oblique side.

The pixel electrode may have a second cutout formed substantially parallel with the first oblique side.

The liquid crystal display may further include a plurality of storage electrode lines each intersecting at least a part of the second oblique side.

The pixel electrode may include first and second sub-pixel electrodes separated from each other by a gap.

The gap may include an oblique portion parallel with the first oblique side.

The voltage of the first sub-pixel electrode and the voltage of the second sub-pixel electrode may be different from each other.

The first sub-pixel electrode and the second sub-pixel electrode may be supplied with different data voltages obtained from a single image data frame.

The liquid crystal display may further include: a first thin film transistor connected to the first sub-pixel electrode; a second thin film transistor connected to the second sub-pixel electrode; a first signal line connected to the first thin film transistor; a second signal line connected to the second thin film transistor; and a third signal line connected to the first and second thin film transistors and that intersects the first and second signal lines.

The first and second thin film transistors may be turned on in response to signals from the first and second signal lines, respectively, and transmit a signal from the third signal line.

The first and second thin film transistors may be turned on in response to a signal from the third signal line and transmit signals from the first and second signal lines, respectively.

The first sub-pixel electrode and the second sub-pixel electrode may be capacitively coupled with each other.

The liquid crystal display may further include: a first thin film transistor connected to the first sub-pixel electrode; a first signal line connected to the first thin film transistor; and another first signal line connected to the first thin film transistor that intersects the first signal line.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
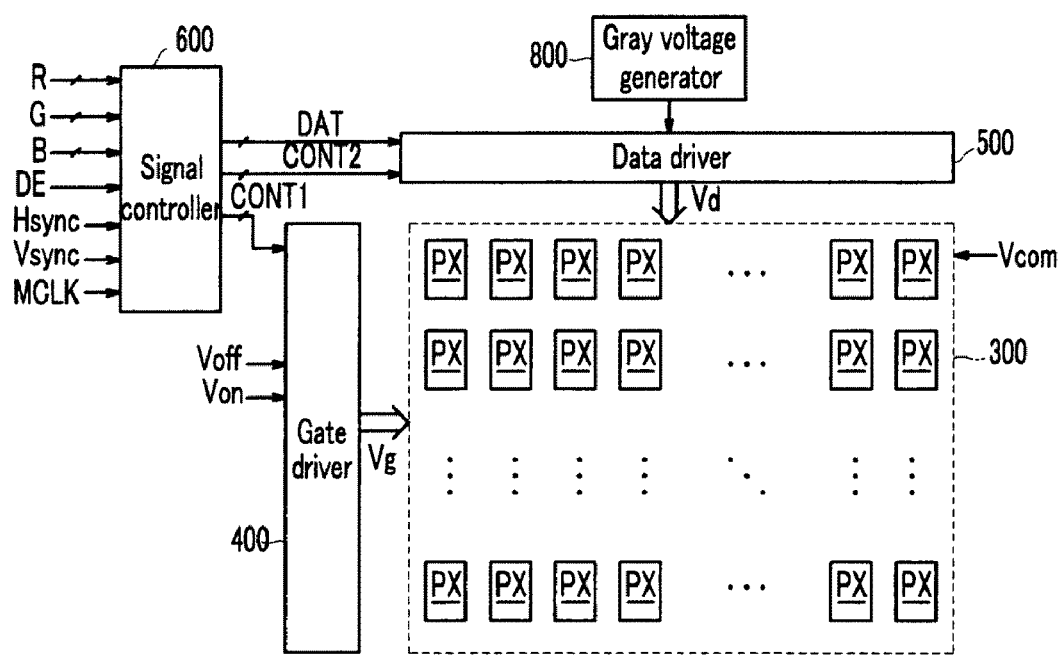
FIG. 1 is a block diagram illustrating a liquid crystal display according to an embodiment of the present invention.

One or more embodiments of the present invention will be described more fully with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display according to an embodiment of the present invention will be described with reference to FIGS. 1 and 2.

Figure 2:
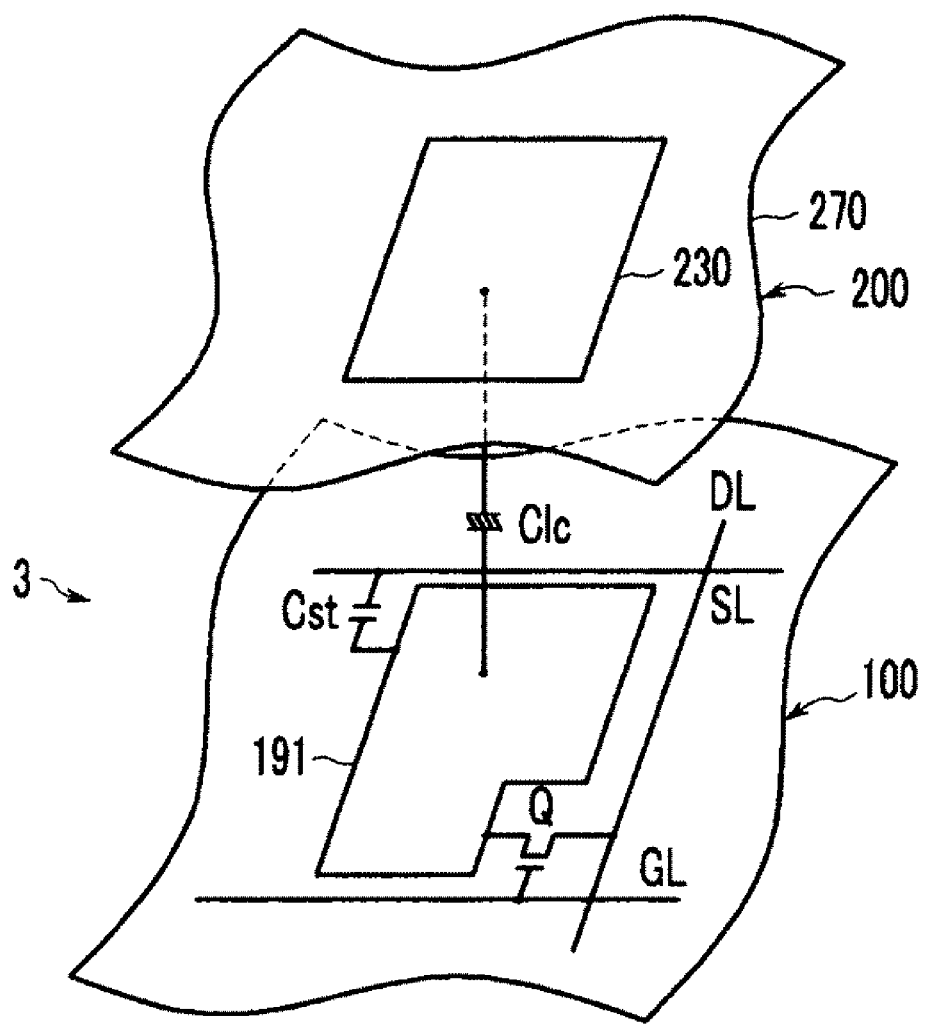
FIG. 2 is an equivalent circuit diagram of one pixel of a liquid crystal panel assembly according to an embodiment of the present invention.

FIG. 1 is a block diagram illustrating a liquid crystal display according to an embodiment of the invention, and FIG. 2 is an equivalent circuit diagram of a pixel of a liquid crystal display according to an embodiment of the present invention.

As shown in FIG. 1, a liquid crystal display according to an embodiment of the present invention includes a liquid crystal panel assembly 300, a gate driver 400 and a data driver 500 connected to liquid crystal panel assembly 300, a gray voltage generator 800 connected to data driver 500, and a signal controller 600 for controlling the above-mentioned components.

In the equivalent circuit diagram, liquid crystal panel assembly 300 is connected to a plurality of signal lines (not shown), and includes a plurality of pixels PX arranged substantially in a matrix. As seen from the structure shown in FIG. 2, liquid crystal panel assembly 300 includes a lower panel 100, an upper panel 200 facing the lower panel 100, and a liquid crystal layer 3 interposed therebetween.

The signal lines include a plurality of gate lines (not shown) for transmitting gate signals (referred to as "scanning signals") and a plurality of data lines (not shown) for transmitting data signals. The gate lines extend substantially in a row direction so as to be parallel to each other, and the data lines extend substantially in a column direction so as to be parallel to each other.

Referring to FIG. 2, as an example, a pixel PX connected to a gate line GL and a data line DL includes a switching element Q connected to the signal lines GL and DL, a liquid crystal capacitor Clc connected to the switching element Q, and a storage capacitor Cst. The storage capacitor Cst may be omitted, if necessary.

The switching element Q is a three-terminal element, such as a thin film transistor, provided on lower panel 100. A control terminal of the switching element Q is connected to the gate line GL, an input terminal thereof is connected to the data line DL, and an output terminal thereof is connected to the liquid crystal capacitor Clc and the storage capacitor Cst.

The liquid crystal capacitor Clc has as two terminals, i.e., a pixel electrode 191 of lower panel 100 and a common electrode 270 of upper panel 200, and also has liquid crystal layer 3 between the two electrodes 191 and 270 as a dielectric. Pixel electrode 191 is connected to the switching element Q, and common electrode 270 is formed on the entire surface of upper panel 200 and is supplied with a common voltage Vcom. Alternatively, unlike the structure shown in FIG. 2, common electrode 270 may be provided on lower panel 100. In this case, at least one of the two electrodes 191 and 270 may be formed in a linear or bar shape.

The storage capacitor Cst, serving as an auxiliary member of the liquid crystal capacitor Clc, is composed of a separate storage signal line SL provided on lower panel 100, pixel electrode 191, and an insulator interposed therebetween. A predetermined voltage, such as a common voltage Vcom, is applied to the storage signal line SL. Alternatively, the storage capacitor Cst may be a laminated or layered structure of pixel electrode 191, the insulator, and a previous gate line formed on the insulator.

Meanwhile, in order to perform color display, each pixel PX specifically displays one of the primary colors (i.e., spatial division), or the pixels PX alternately display the primary colors over time (i.e., temporal division), which causes the primary colors to be spatially or temporally synthesized, thereby displaying a desired color. The primary colors may be composed of, for example, red, green, and blue. As an example of the spatial division, FIG. 2 shows that each pixel PX has a color filter 230 for displaying one of the primary colors in a region of upper panel 200 corresponding to pixel electrode 191. Alternatively, unlike the structure shown in FIG. 2, color filter 230 may be provided above or below pixel electrode 191 of lower panel 100.

At least one polarizer (not shown) for polarizing light is mounted on an outer surface of liquid crystal panel assembly 300.

Referring to FIG. 1 again, gray voltage generator 800 generates a plurality of gray voltages (or reference gray voltages) related to the transmittance of the pixel PX. However, gray voltage generator 800 may generate only a given number of gray voltages (referred to as reference gray voltages) instead of generating all of the gray voltages.

Gate driver 400 is connected to the gate lines of liquid crystal panel assembly 300, and supplies gate signals Vg, each composed of a combination of a gate-on voltage Von and a gate-off voltage Voff, to the gate lines.

Data driver 500 is connected to the data lines of liquid crystal panel assembly 300, selects the gray voltage generated by gray voltage generator 800, and supplies the selected gray voltage to the data lines as a data signal. However, when gray voltage generator 800 does not supply all the gray voltages, but supplies only a predetermined number of reference gray voltages, data driver 500 divides the reference gray voltages to generate gray voltages corresponding to all of the gray-scale levels, and selects the data signal from the generated gray voltages.

Signal controller 600 controls gate driver 400, data driver 500, and gray voltage generator 800.

Each of drivers 400, 500, 600, and 800 may be directly mounted on liquid crystal panel assembly 300 in the form of at least one IC chip, it may be mounted on a flexible printed circuit film (not shown) and then mounted on liquid crystal panel assembly 300 in the form of a TCP (tape carrier package), or it may be mounted on a separate printed circuit board (PCB) (not shown). Alternatively, drivers 400, 500, 600, and 800 may be integrated with liquid crystal panel assembly 300. Alternatively, drivers 400, 500, 600, and 800 may be integrated into a single chip. Alternatively, at least one of the drivers or at least one circuit forming the drivers may be arranged outside the single chip.

A liquid crystal panel assembly according to an embodiment of the present invention will be described in reference to FIGS. 3 to 6A as well as FIGS. 1 and 2.

Figure 3:
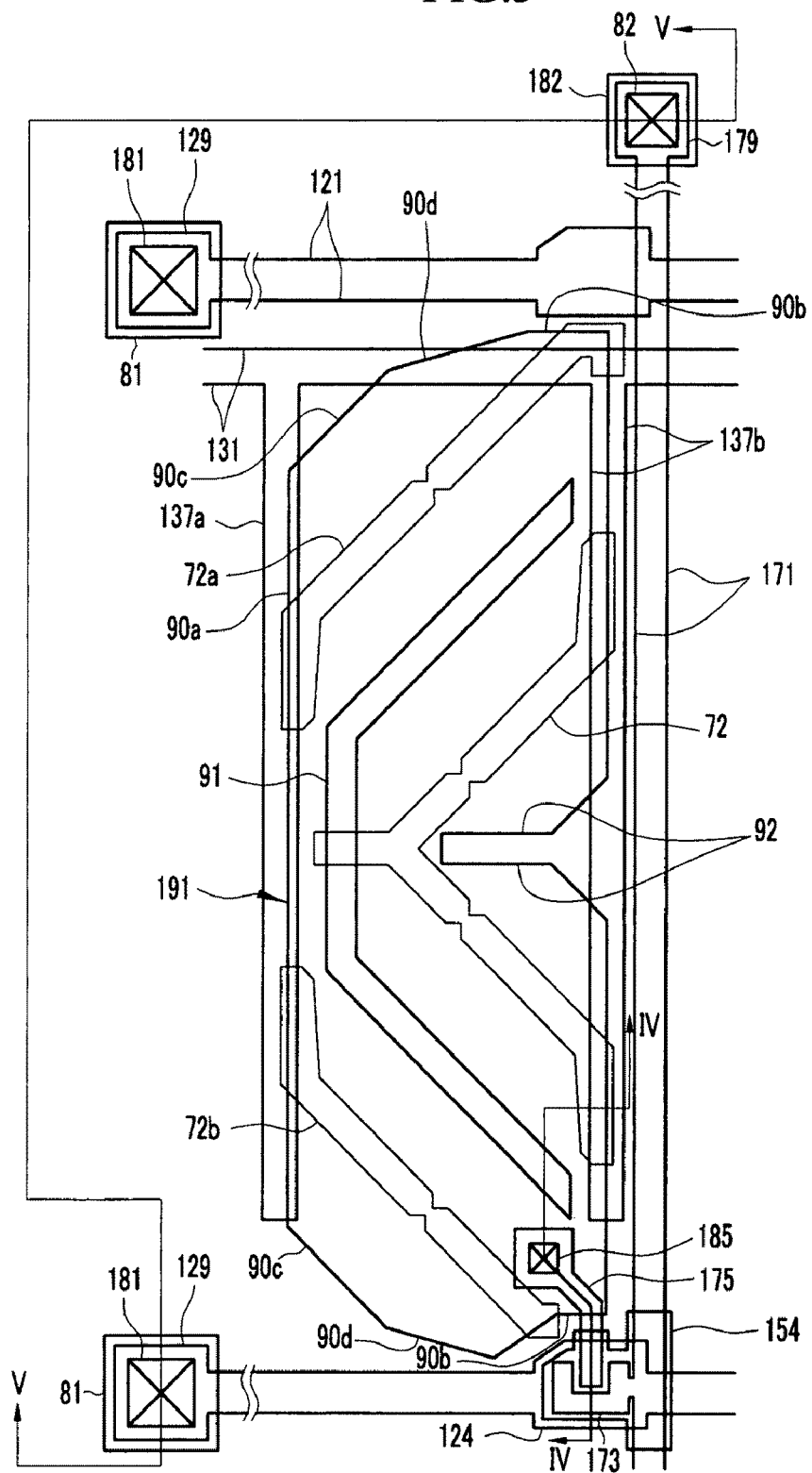
FIG. 3 is a view illustrating the layout of a liquid crystal panel assembly according to an embodiment of the present invention.
Figure 4:
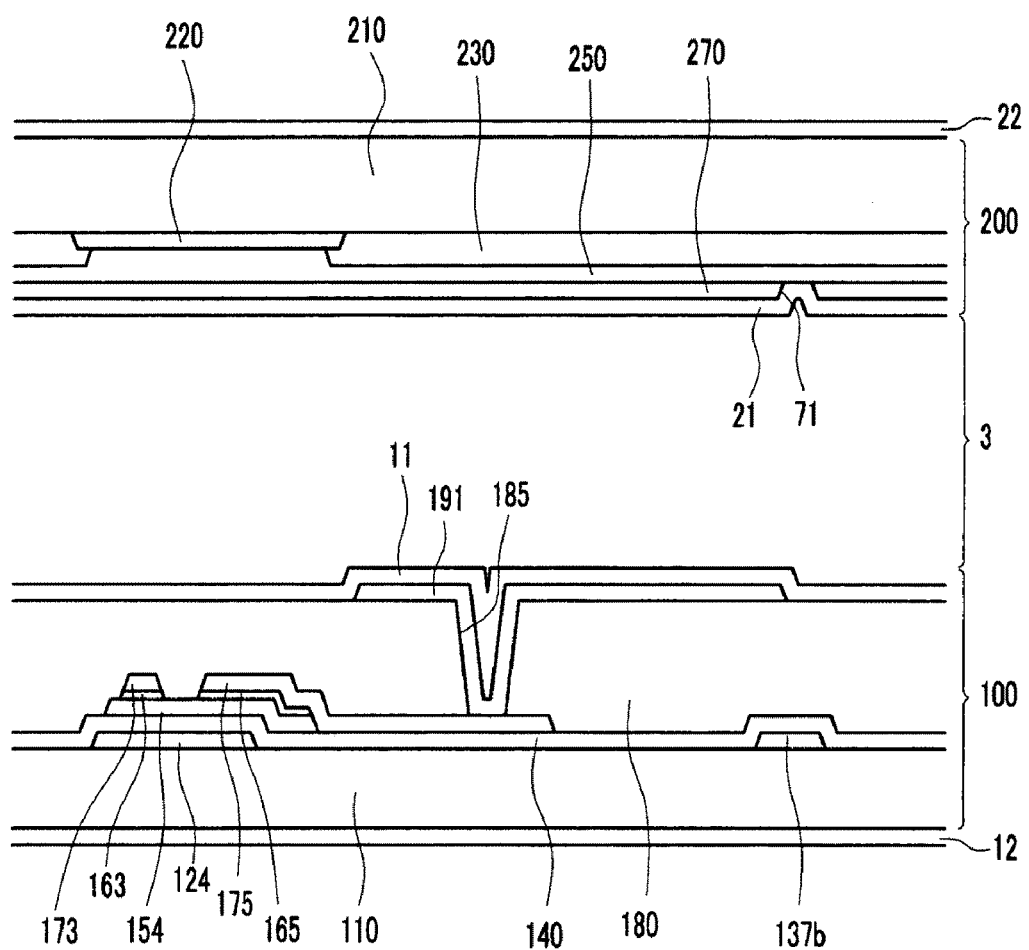
FIGS. 4 and 5 are cross-sectional views of the liquid crystal panel assembly shown in FIG. 3, taken along the lines IV-IV and V-V, respectively.
Figure 5:
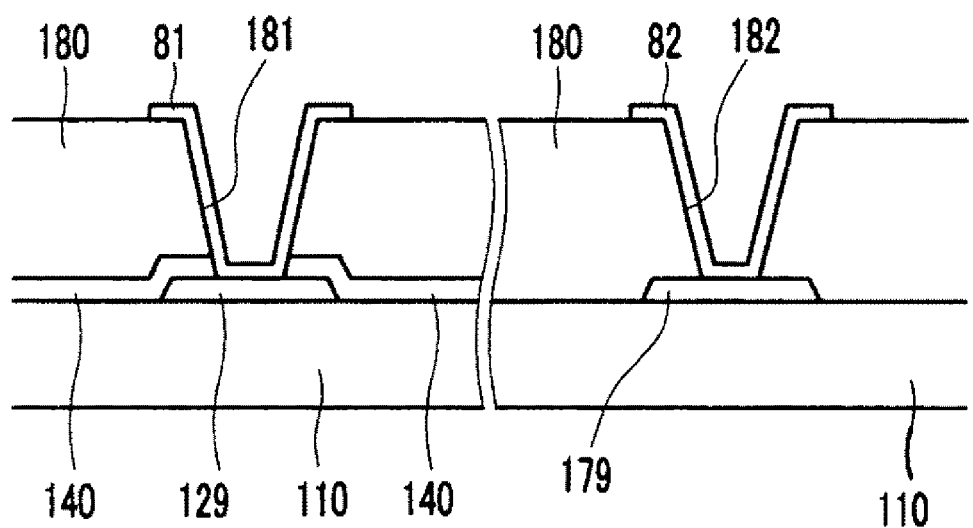
Figure 6A:
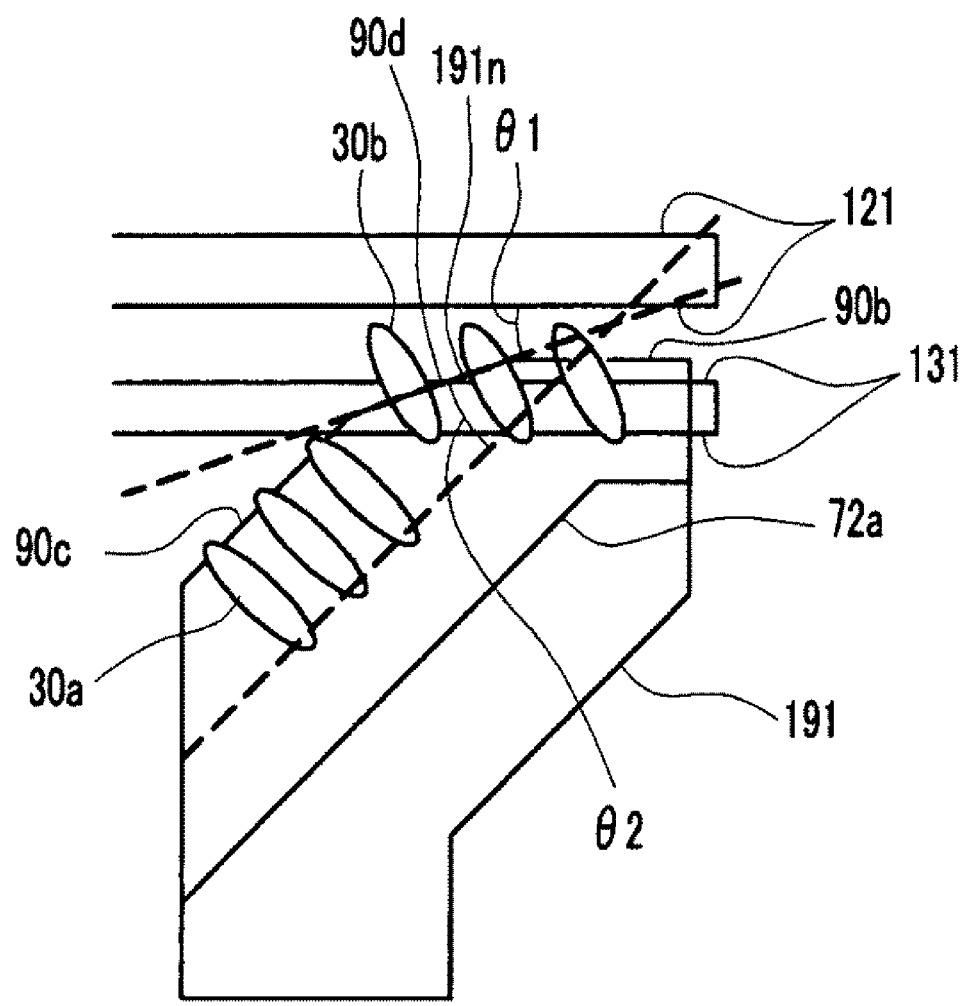
FIG. 6A is a view illustrating a portion of a liquid crystal panel assembly according to an embodiment of the present invention together with the tilt directions of liquid crystal molecules.

FIG. 3 is a view illustrating the layout of a liquid crystal panel assembly according to an embodiment of the present invention. FIGS. 4 and 5 are cross-sectional views of the liquid crystal panel assembly shown in FIG. 3 as taken along the lines IV-IV and V-V, respectively. FIG. 6A is a view illustrating a portion of the liquid crystal panel assembly according to an embodiment of the invention together with the tilt directions of liquid crystal molecules.

Referring to FIGS. 3 to 5, the liquid crystal panel assembly according to an embodiment of this invention includes lower panel 100, upper panel 200 facing lower panel 100, and liquid crystal layer 3 interposed between lower panel 100 and upper panel and 200.

First, the lower panel 100 will be described.

Gate conductors including a plurality of gate lines 121 and a plurality of storage electrode lines 131 are formed on an insulating substrate 110 made of transparent glass or plastic.

Gate lines 121 transmit gate signals and mainly extend in a transverse direction. Each gate line 121 has a wide end portion 129 for connecting a plurality of gate electrodes 124 protruding upward and downward to another layer or an external driving circuit. A gate driving circuit (not shown) for generating a gate signal may be mounted on a flexible printed circuit film (not shown) adhered to substrate 110, or it may be integrated on substrate 110. For example, if the gate driving circuit is integrated with substrate 110, gate lines 121 may extend to be directly connected to the gate driving circuit.

Storage electrode lines 131 are supplied with a predetermined voltage, such as the common voltage Vcom, and includes a stem line and first and second storage electrodes 137a and 137b branched from the stem line. Each storage electrode line 131 is positioned between two neighboring gate lines 121. First and second storage electrodes 137a and 137b extend in a longitudinal direction and face each other. The shape and arrangement of storage electrode line 131 may be variously modified.

Gate lines 121 and storage electrode lines 131 may be conductors formed of aluminum-based metals such as aluminum (Al) or aluminum alloys, silver-based metals such as silver (Ag) or Ag alloys, copper-based metals such as copper (Cu) or copper alloys, molybdenum-based metals such as molybdenum (Mo) or molybdenum alloys, chromium (Cr), tantalum (Ta), titanium (Ti), etc. Alternatively, each of gate lines 121 and storage electrode lines 131 may have a multi-layer structure including two conductive layers (not shown) having different physical properties. In this case, one of the conductive layers may be made of a low-resistivity metal, for example an aluminum-based metal, a silver-based metal, or a copper-based metal to reduce signal delay or voltage drop. The other of the conductive layers may be made of a material different from that of the first one, such as, for example, a molybdenum-based metal, chromium, tantalum or titanium material having excellent physical, chemical, and electrical contact characteristics for adhesion to indium tin oxide (ITO) and indium zinc oxide (IZO). Each gate conductor (i.e., each gate line 121 or storage electrode line 131) may preferably have a multilayer structure of a chromium lower layer and an aluminum (alloy) upper layer, or of an aluminum (alloy) lower layer and a molybdenum (alloy) upper layer. Gate lines 121 and storage electrode lines 131 may also be formed of various other metals or conductive materials.

The lateral sides of each of gate lines 121 and storage electrode lines 131 are preferably inclined at an angle of 30° to 80° with respect to the surface of substrate 110.

On gate lines 121 and storage electrode lines 131, including storage electrodes 137a and 137b, a gate insulating layer 140 is formed of, for example, silicon nitride ($SiN_x$) or silicon oxide ($SiO_x$).

On gate insulating layer 140, a plurality of island-shaped semiconductors 154 are formed of hydrogenated amorphous silicon (hereinafter, amorphous silicon will be referred to as a-Si) or polysilicon, for example. Semiconductor 154 is positioned on gate electrode 124.

On semiconductor 154, a pair of island-shaped ohmic contacts 163 and 165 are formed. Ohmic contacts 163 and 165 may be formed of, for example, n+ hydrogenated a-Si doped with n-type impurities, such as phosphorus, at a high concentration, or of silicide.

The lateral sides of each of semiconductor 154 and ohmic contacts 163 and 165 are also inclined at an angle of about 30° to 80° with respect to the surface of substrate 110.

Data conductors, including a plurality of data lines 171 and a plurality of drain electrodes 175, are formed on ohmic contacts 163 and 165 and gate insulating layers 140.

Data lines 171 transmit data signals, mainly extend in a longitudinal direction, and intersect gate lines 121 and storage electrode lines 131. Each data line 171 extends toward gate electrode 124 and has a wide end portion 179 for connecting a plurality of U-shaped source electrodes 173 to another layer or data driver 500. For example, if data driver 500 is integrated with substrate 110, data line 171 extends so as to be directly connected to data driver 500.

Drain electrode 175 is separated from data line 171. Drain electrode 175 is disposed opposite source electrode 173 with respect to gate electrode 124. Each drain electrode 175 has one wide end portion, and a bar-shaped end portion that is surrounded by source electrode 173.

One gate electrode 124, one source electrode 173, and one drain electrode 175 form one thin film transistor (TFT) together with semiconductor 154. A channel of the TFT is formed in semiconductor 154 between source electrode 173 and drain electrode 175.

Each of data conductors 171 and 175 is preferably formed of a refractory metal, such as molybdenum, chromium, tantalum, or titanium, or an alloy thereof, and may have a multilayer structure including a refractory metal layer (not shown) and a low-resistance conductive layer (not shown). Examples of the multilayer structure include a double-layer structure of a chromium or molybdenum (alloy) lower layer and an aluminum (alloy) upper layer, and a triple-layer structure of a molybdenum (alloy) lower layer, an aluminum (alloy) intermediate layer, and a molybdenum (alloy) upper layer. Each of data conductors 171 and 175 may be formed of various other metals or conductive materials.

Data conductors 171, 175a and 175b may have inclined edge profiles, and the inclination angles thereof range about 30-80 degrees.

Ohmic contacts 163 and 165 exist only between semiconductor 154 and data conductors 171 and 175 and reduce the contact resistance therebetween. Since data conductors 171 and 175 do not completely cover semiconductor 154, some portions of semiconductor 154, such as a portion between source electrode 173 and drain electrode 175, are exposed.

A passivation layer 180 is formed on data conductors 171 and 175 and exposed portions of semiconductor 154. Passivation layer 180 may be formed, for example, of an inorganic insulator or an organic insulator, and the surface thereof may be even. The organic insulator preferably has a dielectric constant less than 4.0, and may have photosensitivity. Also, passivation layer 180 may have a double-layer structure of a lower inorganic layer and an upper organic layer so as to make the most of insulating characteristic thereof but to not damage the exposed portion of semiconductor 154.

A plurality of contact holes 182 and 185 are formed in passivation layer 180 to expose end portions 179 of data lines 171 and one end of each of drain electrodes 175, respectively. Further, a plurality of contact holes 181 are formed in passivation layer 180 and gate insulating layer 140 to expose end portions 129 of gate lines 121, respectively.

A plurality of pixel electrodes 191 and a plurality of contact assistants 81 and 82 are formed on passivation layer 180. Pixel electrodes 191 and contact assistants 81 and 82 may be formed of a transparent conductive material such as ITO or IZO, or a reflective material such as aluminum, silver, chromium, or an alloy thereof.

Pixel electrode 191 is physically and electrically connected to drain electrode 175 through contact hole 185, and a data voltage is applied to drain electrode 175. When the data voltage is applied, pixel electrode 191 and common electrode 270 of common electrode panel 200 supplied with a common voltage generate an electric field, which determines the tilt directions of the liquid crystal molecules of liquid crystal layer 3 between the two electrodes 191 and 270. According to the tilt directions of the liquid crystal molecules, the polarization of light passing through liquid crystal layer 3 varies. Pixel electrode 191 and common electrode 270 form a capacitor (hereinafter, referred to as a 'liquid crystal capacitor') that holds the applied voltage even after the TFT is turned off.

Pixel electrode 191 overlaps storage electrode line 131 including storage electrodes 137a and 137b to form a capacitor, which is referred to as a storage capacitor. The storage capacitor Cst enhances the voltage holding ability of the liquid crystal capacitor Clc.

Referring to FIGS. 6A and 3, each pixel electrode 191 has a substantially rectangular shape having four main sides 90a and 90b parallel with gate line 121 or data line 171. The four main sides include a pair of longitudinal sides 90a and a pair of transverse sides 90b.

The left corner of each pixel electrode 191 is chamfered to form a first oblique side 90c. First oblique side 90c is inclined at an angle of about 45° with respect to gate line 121.

A second oblique side 90d connects between first oblique side 90c and transverse side 90b. Second oblique side 90d is inclined at an oblique angle Θ1 with respect to gate line 121, and the oblique angle Θ1 is smaller than the oblique angle between first oblique side 90c and gate line 121. Preferably, the angle Θ1 between second oblique side 90d and gate line 121 is in the range of 0° to 45°, and the angle Θ2 between second oblique side 90d and first oblique side 90c is in the range of 0° to 45°.

In pixel electrode 191, a first central cutout 91 and a second central cutout 92 are formed. Cutouts 91 and 92 divide pixel electrode 191 into a plurality of partitions. Each of cutouts 91 and 92 is symmetric with respect to a virtual transverse center line dividing pixel electrode 191 into two partitions.

First central cutout 91 includes a longitudinal portion and a pair of oblique portions connected to the longitudinal portion. The longitudinal portion shortly extends in a direction perpendicular to the transverse center line, and the pair of oblique portions extend substantially parallel with first oblique sides 90c from the longitudinal portion toward the right side of pixel electrode 191.

The lower half portion of pixel electrode 191 is divided into two partitions by one of the oblique portions of first central cutout 91, and the upper half portion of pixel electrode 191 is also divided into two partitions by the other of the oblique portions of first central cutout 91. The number of partitions or cutouts may be changed according to the size of pixel electrode 191, the ratio of the transverse side to the longitudinal side of pixel electrode 191, and the type or characteristics of liquid crystal layer 3.

Second central cutout 92 includes a transverse portion extending along the transverse center line of pixel electrode 191.

Contact assistants 81 and 82 are connected to end portions 129 of gate lines 121 and end portions 179 of data lines 171 through contact holes 181 and 182, respectively. Contact assistants 81 and 82 complement the adhesive properties of end portions 129 of gate lines 121 and end portions 179 of data lines 171 to the external device and protect the end portions of gate lines 121 and data lines 171.

Next, upper panel 200 will be described.

A light blocking member 220 is formed on an insulating substrate 210 made of transparent glass or plastic. Light blocking member 220 is also called a black matrix, and prevents light leakage between pixel electrodes 191. Light blocking member 220 has linear portions 221 corresponding to data lines 171 and planar portions 222 corresponding to the TFTs. Light blocking member 220 prevents light leakage between pixel electrodes 191, and defines opening areas facing pixel electrodes 191. Light blocking member 220 may have a plurality of openings (not shown) that face pixel electrodes 191 and have substantially the same shape as pixel electrodes 191.

A plurality of color filters 230 are also formed on substrate 210. Color filters 230 mostly exist in regions surrounded by light blocking member 220 and may extend along columns of pixel electrodes 191 in a longitudinal direction. Each color filter 230 may display one of the primary colors composed of, for example, red, green, and blue.

An overcoat 250 is formed on color filters 230 and light blocking member 220. Overcoat 250 may be formed of an insulating material, and prevents color filters 230 from being exposed and provides a flat surface. Overcoat 250 may be omitted.

Common electrode 270 is formed on overcoat 250. Common electrode 270 is formed of, for example, a transparent conductive material such as ITO or IZO, and a plurality of cutout groups 71, 72a, and 72b are formed on common electrode 270.

One of cutout groups 71 to 72b faces one pixel electrode 191 and includes central cutout 71, lower cutout 72a, and upper cutout 72b. Cutouts 71, 72a, and 72b are disposed between neighboring cutouts 91 to 92b of pixel electrode 191 or between cutouts 92a and 92b and oblique sides 90a and 90b pixel electrode 191. Also, each of cutouts 71, 72a, and 72b includes at least one oblique portion extending substantially parallel with lower cutout 92a or upper cutout 92b of pixel electrode 191. Each of cutouts 71, 72a, and 72b is symmetric with respect to the transverse center line of pixel electrode 191.

Each of lower and upper cutouts 72a and 72b includes an oblique portion, a transverse portion, and a longitudinal portion. The oblique portion extends substantially from the upper or lower side of pixel electrode 191 toward the left side thereof. The transverse and longitudinal portions extend from the ends of the oblique portions along the sides of pixel electrode 191 to overlap the sides of pixel electrode 191, and each of the transverse and longitudinal portions is inclined at an obtuse angle with respect to the oblique portion.

Central cutout 71 includes a transverse center portion, a pair of oblique portions, and a pair of longitudinal end portions. The transverse center portion extends substantially from the left side of pixel electrode 191 toward the right side along the transverse center line of pixel electrode 191. The pair of oblique portions extend substantially parallel to lower and upper cutouts 72a and 72b from an end of the transverse center portion toward the right side of pixel electrode 191 to be inclined at obtuse angles with respect to the transverse center portion. The longitudinal end portion extends from an end of the corresponding oblique portion along the right side of pixel electrode 191 to overlap the right side and be inclined at an obtuse angle with respect to the corresponding oblique portion.

The number of cutouts 71, 72a, and 72b may also be changed according to the design elements, and light blocking member 220 may overlap cutouts 71, 72a, and 72b to prevent light leakage in the vicinities of cutouts 71, 72a, and 72b.

At least one of cutouts 71, 72a, 72b, 91, and 92 may be substituted for a protrusion (not shown) or a depression (not shown). The protrusion may be formed of an organic material or an inorganic material, and may be disposed on or electric field generating electrodes 191 and 270.

Alignment layers 11 and 21 are formed on the inner surfaces of underneath electric field generating electrodes 191 and 270. display panels 100 and 200, respectively, and may be longitudinal alignment layers.

Polarizers 12 and 22 are provided on the outer surfaces of display panels 100 and 200, respectively. Preferably, the polarization axes of two polarizers 12 and 22 are perpendicular to each other, and one of the polarization axes is parallel to gate lines 121a and 121b. In a reflective liquid crystal display, one of two polarizers 12 and 22 may be omitted.

The liquid crystal display may additionally include a backlight unit (not shown) for illuminating the polarizers 12 and 22, and a retardation film (not shown), the display panels 100 and 200, and the liquid crystal layer 3.

Liquid crystal layer 3 has negative dielectric anisotropy. When no electric field exists, the liquid crystal molecules of liquid crystal layer 3 are aligned such that the major axes of the liquid crystal molecules are longitudinal to the surfaces of two display panels 100 and 200.

Now, the operation of a liquid crystal display will be described.

Signal controller 600 is supplied with input image signals R, G, and B and input control signals for displaying the input image signals from a graphics controller (not shown). The input image signals R, G, and B include luminance information of each pixel PX, and luminance has a predetermined gray-scale level of, for example, $1024 (=2^{10})$, $256 (=2^8)$, or $64 (=2^6)$ grays. For example, any of the following signals may be used as the input control signal: a longitudinal synchronization signal Vsync, a transverse synchronization signal Hsync, a main clock signal MCLK, and a data enable signal DE.

Signal controller 600 processes the input image signals R, G, and B so as to be suitable for the operational conditions of liquid crystal panel assembly 300 and data driver 500 on the basis of the input control signals, and generates, for example, a gate control signal CONT1 and a data control signal CONT2. Then, signal controller 600 transmits the gate control signal CONT1 to gate driver 400 and transmits the data control signal CONT2 and the processed image signal DAT to data driver 500. The output image signal DAT is a digital signal and has a value (or grays) of a predetermined number of bits.

The gate control signal CONT1 includes a scanning start signal STV for indicating the start of scanning and at least one clock signal for controlling the output cycle of the gate-on voltage Von. The gate control signal CONT1 may further include an output enable signal OE for defining the duration of the gate-on voltage Von.

The data control signal CONT2 includes a transverse synchronization start signal STH for indicating that the transmission of data to a group of sub-pixels starts, a load signal LOAD for allowing data signals to be transmitted to the liquid crystal panel assembly 300, and a data clock signal HCLK. The data control signal CONT2 may further include an inversion signal RVS for inverting the polarity of a data signal voltage with respect to the common voltage Vcom (hereinafter, "the polarity of a data signal voltage with the common voltage" is simply referred to as "the polarity of a data signal").

Data driver 500 receives the digital image signal DAT for a group of sub-pixels in response to the data control signal CONT2 transmitted from signal controller 600, selects a gray voltage corresponding to each digital image signal DAT, converts the digital image signal DAT into an analog data signal, and supplies the analog data signal to the corresponding data lines.

Gate driver 400 applies the gate-on voltage Von to the gate lines on the basis of the gate control signal CONT1 from signal controller 600 to turn on the switching elements connected to the gate lines. Then, the data signals applied to the data lines are applied to the corresponding pixels through the switching elements which are in an on state.

These processes are repeatedly performed for every one transverse period (which is referred to as "1H" and is equal to one period of the transverse synchronization signal Hsync and the data enable signal DE). In this way, the data signals are applied to all the pixels PX, thereby displaying one frame of an image.

When one frame has ended, the next frame starts. In this case, the state of the inversion signal RVS applied to data driver 500 is controlled such that the polarity of the data signal voltage applied to each pixel PX is opposite to the polarity of the data signal voltage in the previous frame ("frame inversion"). The polarity of the data signal applied to one data line may be inverted in the same frame according to the characteristic of the inversion signal RVS (for example, row inversion and dot inversion), and the polarities of the data signals applied to a row of pixels may be different from each other (for example, column inversion and dot inversion).

Now, tilt directions of liquid crystal molecules of a liquid crystal display according to an embodiment of the present invention will be described with reference to FIG. 6B and FIGS. 7A to 9C as well as FIGS. 3 and 6A.

Figure 6B:
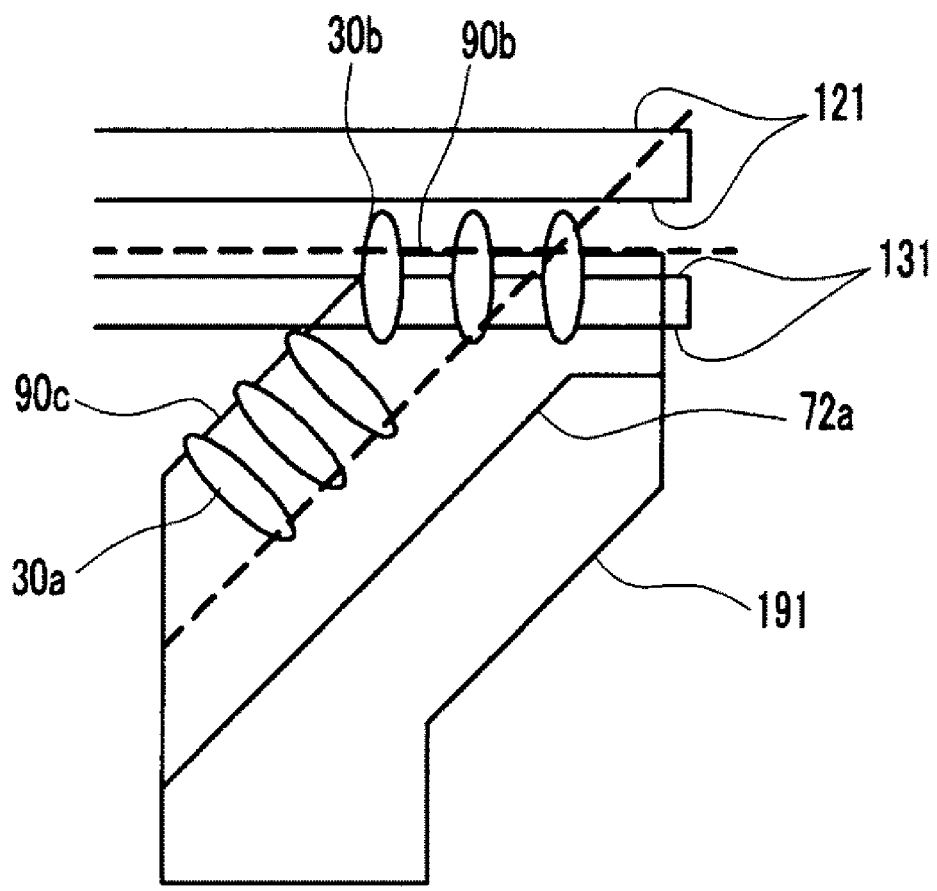
FIG. 6B is a view illustrating a portion of a liquid crystal panel assembly according to prior art together with the tilt directions of liquid crystal molecules.
Figure 7A:
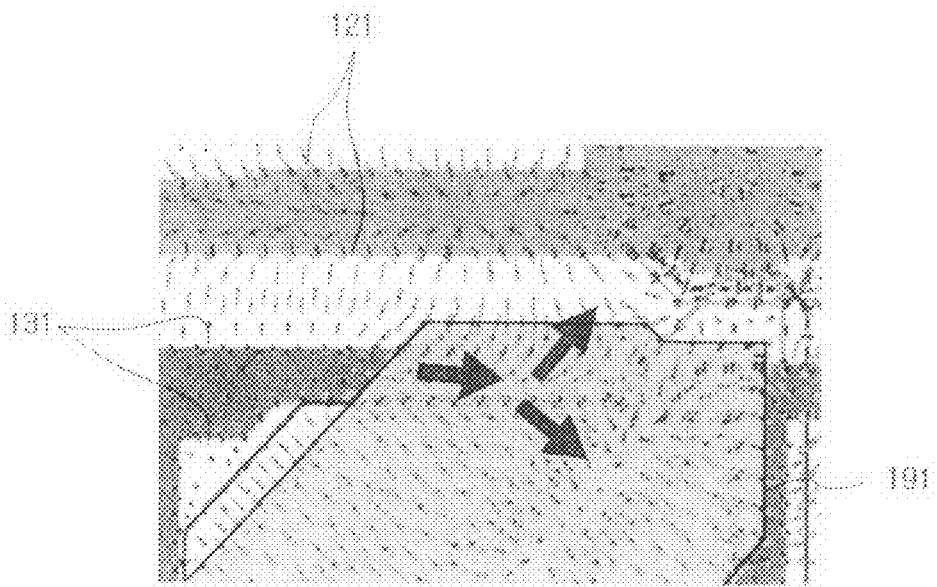
FIG. 7A is a view illustrating an optical simulation of the movement of the liquid crystal molecules in the liquid crystal panel assembly according to prior art.
Figure 7B:
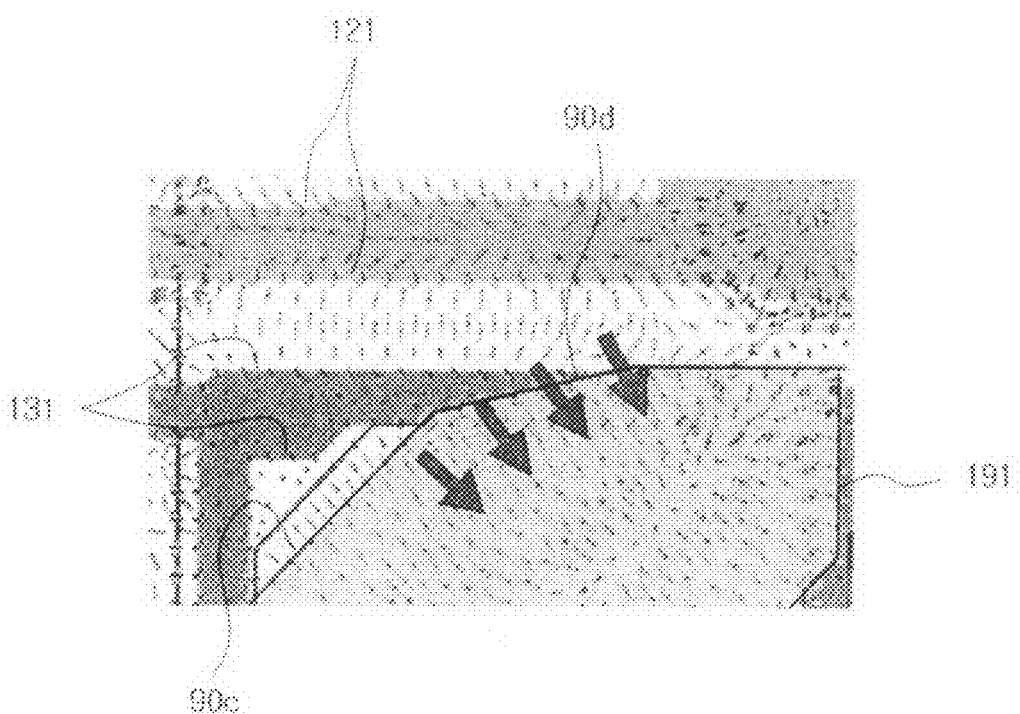
FIG. 7B is a view illustrating an optical simulation of the movement of liquid crystal molecules in a liquid crystal panel assembly according to an embodiment of the present invention.
Figure 8A:
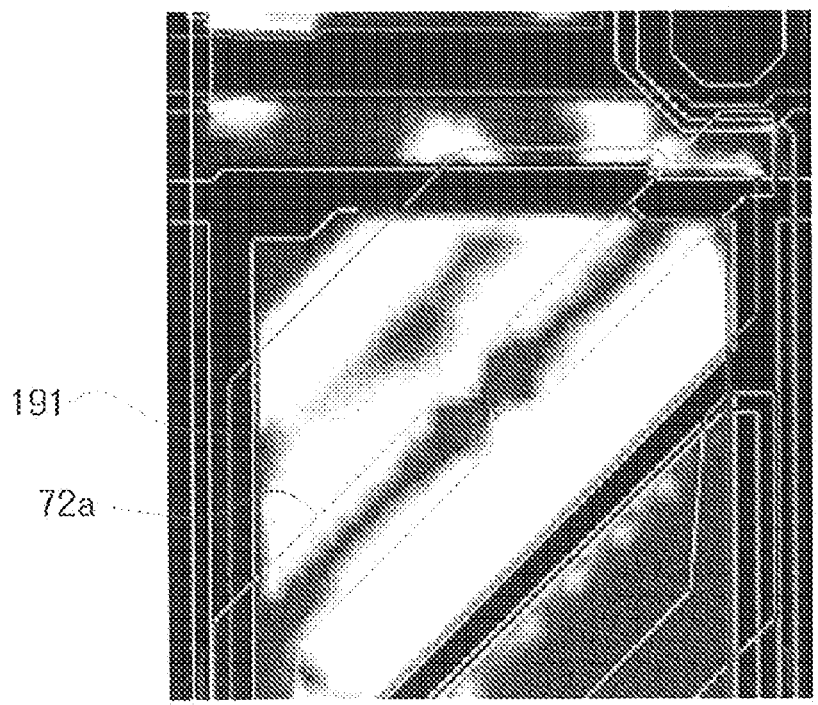
FIGS. 8A to 8C are views time-sequentially illustrating an optical simulation of the movement of liquid crystal molecules in a liquid crystal panel assembly according to prior art.
Figure 8B:
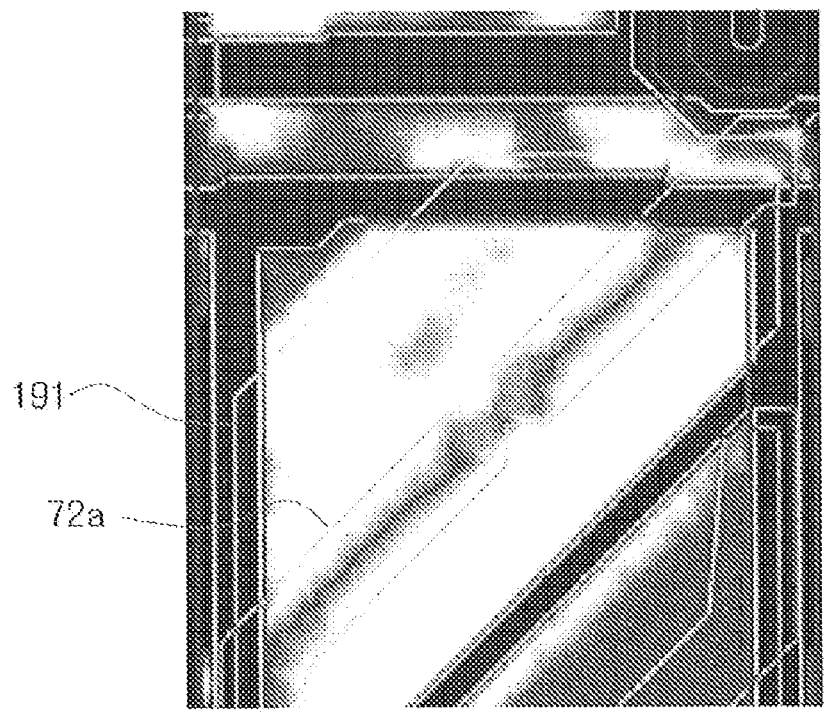
Figure 8C:
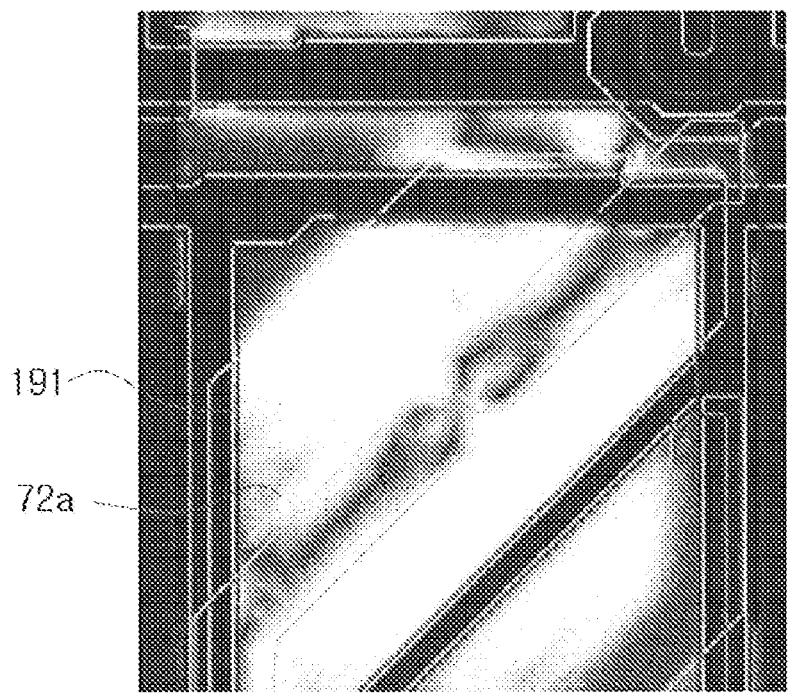
Figure 9A:
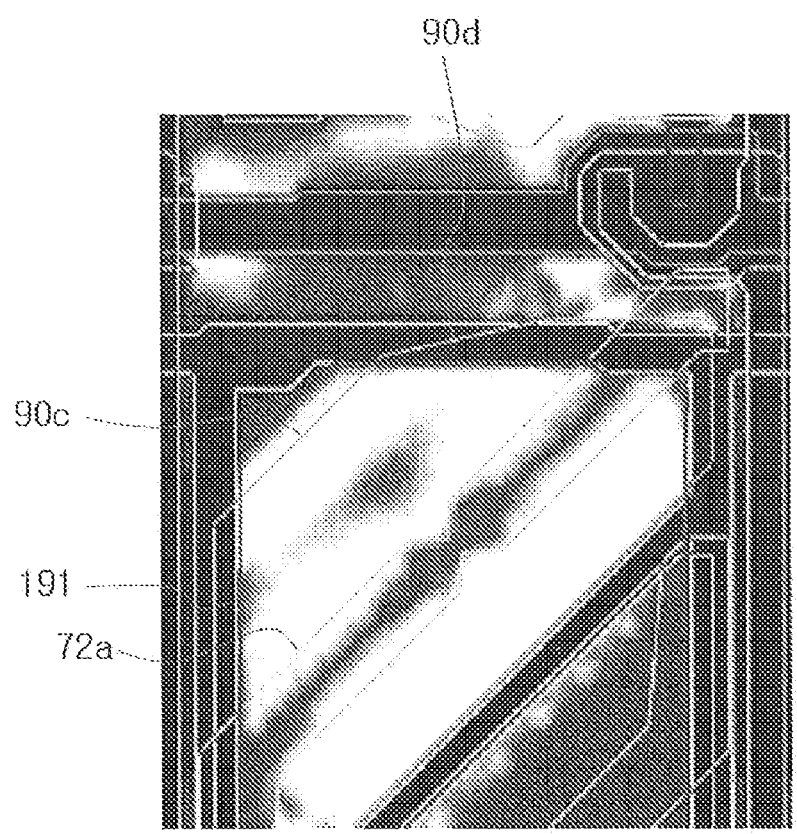
FIGS. 9A to 9C are views time-sequentially illustrating an optical simulation of the movement of liquid crystal molecules in a liquid crystal panel assembly according to an embodiment of the present invention.
Figure 9B:
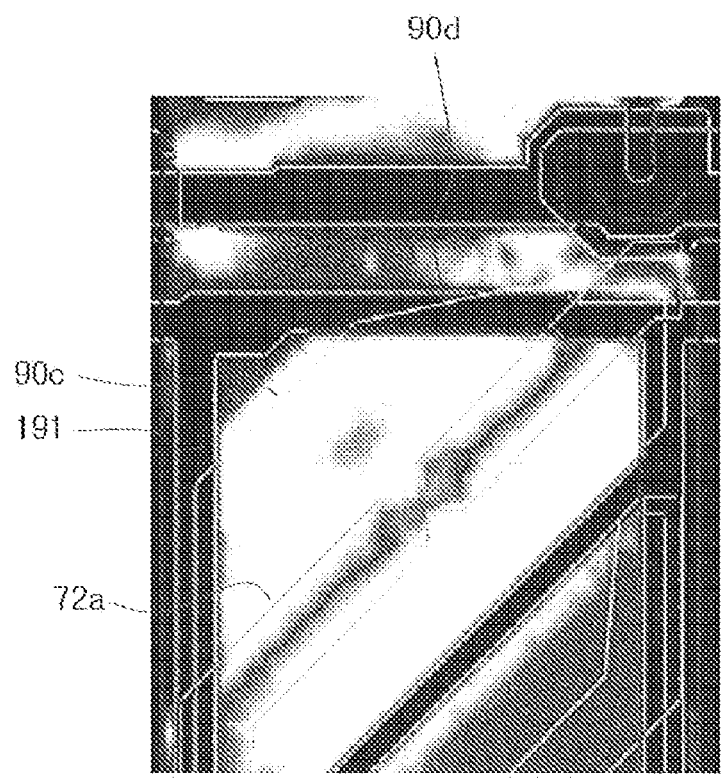
Figure 9C:
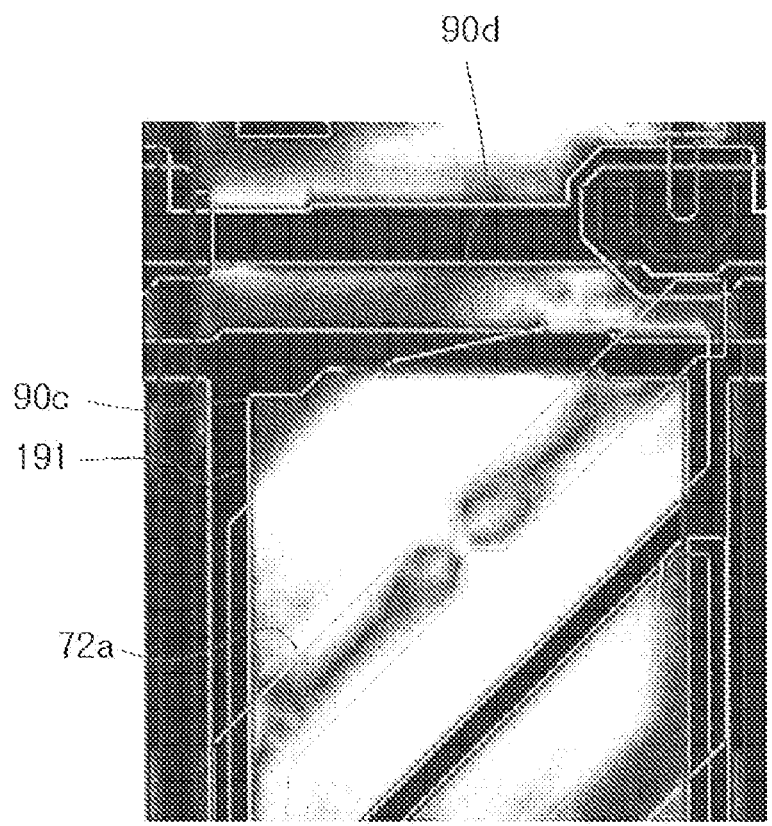

FIG. 6A is a view illustrating a portion of a liquid crystal panel assembly according to an embodiment of the invention, together with the tilt directions of liquid crystal molecules. FIG. 6B is a view illustrating a portion of a liquid crystal panel assembly according to prior art, together with the tilt directions of liquid crystal molecules. FIG. 7A is a view illustrating an optical simulation of the movement of the liquid crystal molecules in the liquid crystal panel assembly according to prior art. FIG. 7B is a view illustrating an optical simulation of the movement of liquid crystal molecules in a liquid crystal panel assembly according to an embodiment of the present invention. FIGS. 8A to 8C are views time-sequentially illustrating an optical simulation of the movement of liquid crystal molecules in a liquid crystal panel assembly according to prior art. FIGS. 9A to 9C are views time-sequentially illustrating an optical simulation of the movement of liquid crystal molecules in a liquid crystal panel assembly according to an embodiment of the present invention.

The tilt direction of each liquid crystal molecule is primarily determined by a transverse component of a primary electric field distorted by cutouts 71, 72a, 72b, 91, and 92 of electric field generating electrodes 191 and 270 and oblique sides 90c and 90d of pixel electrode 191. Such a transverse component of the primary electric field is substantially longitudinal to the sides of cutouts 71, 72a, 72b, 91, and 92 and oblique sides 90c and 90d of pixel electrode 191.

Since most of the liquid crystal molecules on each of the partitions by cutouts 71, 72a, 72b, 91, and 92 are tilted in a direction longitudinal to the main sides, the tilt directions of the liquid crystal molecules are basically classified into four directions. When the tilt directions of the liquid crystal molecules are diversified in this way, the reference viewing angle of the liquid crystal display may be increased.

Referring to FIGS. 6B and 7A, liquid crystal molecules 30a in the vicinity of oblique side 90c of pixel electrode 191 are tilted in a direction longitudinal to oblique side 90c and a side of cutout 72a of common electrode 270. However, liquid crystal molecules 30b in the vicinity of transverse side 90b of pixel electrode 191 parallel with gate line 121 are tilted in a direction longitudinal to transverse side 90b of another pixel electrode 191. Further, since liquid crystal molecules 30b are close to gate line 121, they are affected by a gate voltage applied to gate line 121. Therefore, liquid crystal molecule 30b in that portion is tilted in a direction different from the tilt direction of liquid crystal molecule 30a in the vicinity of oblique side 90c of pixel electrode 191. As a result, a texture is generated. Therefore, the response speed of liquid crystal molecules 30b may be lowered and a residual image appears.

In contrast, as shown in FIGS. 6A and 7B, when second oblique side 90d is formed between first oblique side 90c and transverse side 90b of pixel electrode 191, liquid crystal molecules 30b are tilted in a direction longitudinal to second oblique side 90d. Therefore, liquid crystal molecules 30 are tilted in the direction substantially longitudinal to first oblique side 90c regardless of the gate voltage applied to gate line 121 and thus a texture is prevented from being generated.

Referring to FIGS. 8A to 8C and FIGS. 9A to 9C, in both the liquid crystal panel assembly according to the prior art and a liquid crystal panel assembly according to an embodiment of the present invention, the frequency, or persistence, of texture generation is decreased as time passes. However, when FIG. 8A is compared to FIG. 9A, it is apparent that the frequency (or persistence) of texture generation in the liquid crystal panel assembly according to the prior art remains high for a longer elapsed time. Further, it is apparent that, in the liquid crystal panel assembly according to an embodiment of the present invention, the frequency (i.e., persistence) of texture generation is remarkably low even at the initial time and the response speed of the liquid crystal is faster.

Now, a liquid crystal panel assembly according to an embodiment of the present invention will be described with reference to FIGS. 10 to 13.

Figure 10:
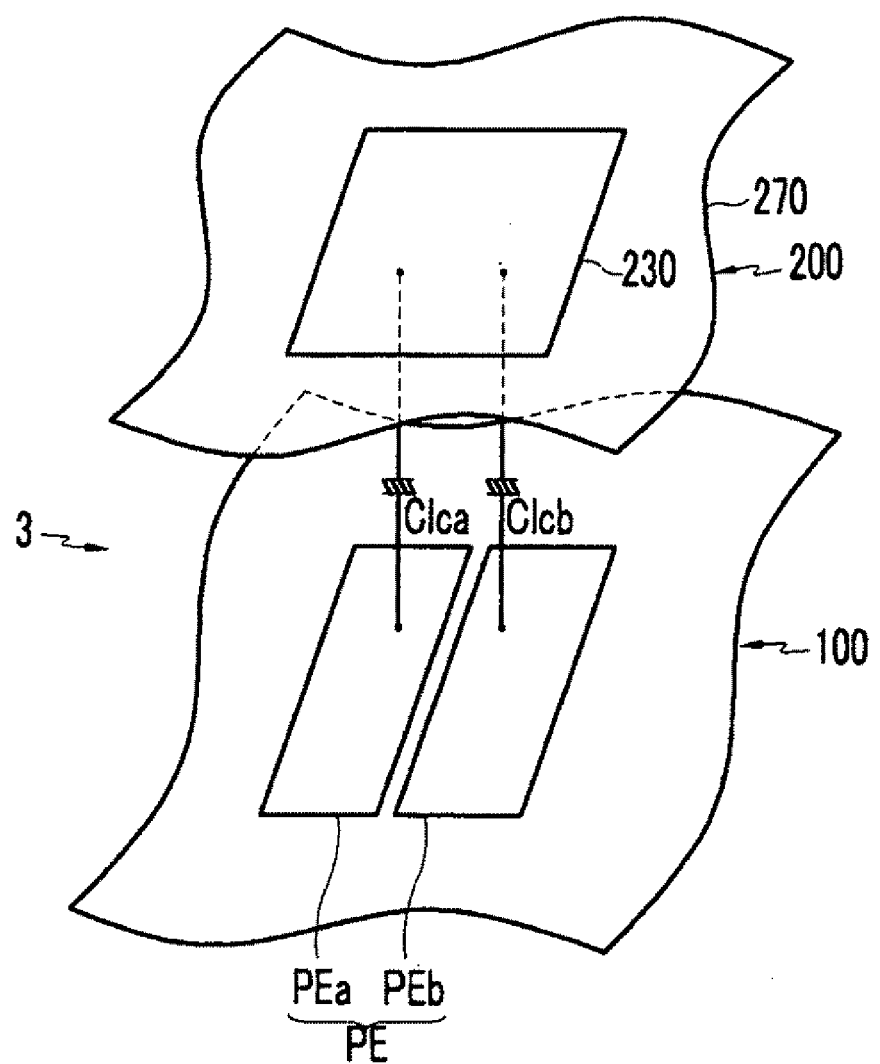
FIG. 10 is an equivalent circuit diagram of two sub-pixels of a liquid crystal display according to an embodiment of the present invention.

FIG. 10 is an equivalent circuit diagram of two sub-pixels of a liquid crystal display according to an embodiment of the invention.

Referring to FIG. 10, each pixel PX includes a pair of sub-pixels, which include liquid crystal capacitors Clca and Clcb, respectively. At least one of the two sub-pixels includes a switching element (not shown) connected to a gate line, a data line, and the liquid crystal capacitor Clca or Clcb.

The liquid crystal capacitor Clca or Clcb includes a sub-pixel electrode PEa or PEb of lower panel 100 and common electrode 270 of upper panel 200, serving as two terminals, and liquid crystal layer 3, serving as a dielectric material, interposed between the sub-pixel electrode PEa or PEb and common electrode 270. The pair of sub-pixel electrodes PEa and PEb are separated from each other and form one pixel electrode PE. Common electrode 270 is formed on the entire surface of upper panel 200, and a common voltage Vcom is applied to common electrode 270. Liquid crystal layer 3 has negative dielectric anisotropy. When no electric field exists, the liquid crystal molecules of liquid crystal layer 3 are aligned such that the major axes of the liquid crystal molecules are longitudinal to the surfaces of the two display panels.

In this embodiment, color filters 230 and polarizers (not shown) are the same as those in the previous embodiment and thus a description thereof will be omitted.

Now, a liquid crystal panel assembly according to an embodiment of the present invention will be described with reference to FIGS. 11 to 13 and FIG. 1.

Figure 11:
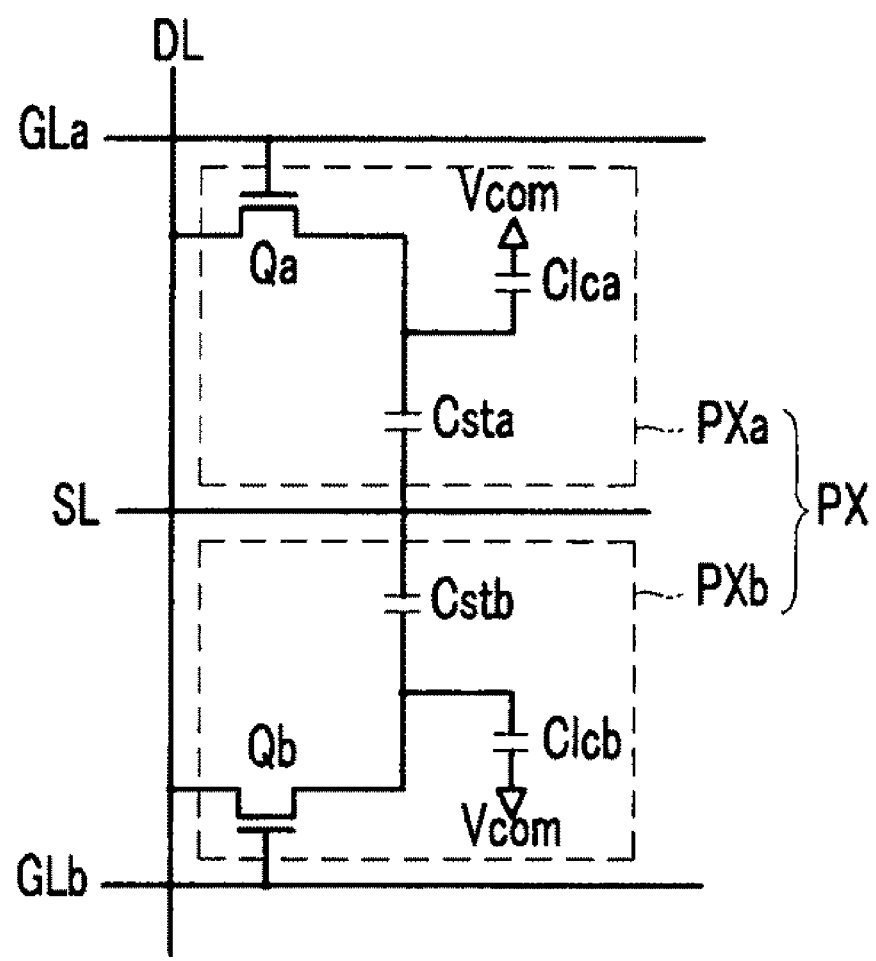
FIG. 11 is an equivalent circuit diagram of one pixel of a liquid crystal panel assembly according to an embodiment of the present invention.

FIG. 11 is an equivalent circuit diagram of one pixel of a liquid crystal panel assembly according to an embodiment of the invention.

Referring to FIG. 11, the liquid crystal panel assembly according to this embodiment includes a plurality of signal lines including a plurality of pairs of gate lines GLa and GLb, a plurality of data lines DL, and a plurality of storage electrode lines SL, and a plurality of pixels PX connected to the signal lines.

Each pixel PX includes a pair of sub-pixels PXa and PXb. The sub-pixel PXa includes a switching element Qa connected to a gate line GLa and a data line DL, the liquid crystal capacitor Clca connected to the switching element Qa, and a storage capacitor Csta connected to the switching element Qa and a storage electrode line SL. The sub-pixel PXb includes a switching element Qb connected to a gate line GLb and the data line DL, the liquid crystal capacitor Clcb connected to the switching element Qb, and a storage capacitor Cstb connected to the switching element Qb and the storage electrode line SL.

Each of the switching elements Qa and Qb is a three-terminal element, such as a thin film transistor, provided on lower panel 100. A control terminal of the switching element Qa is connected to the gate line GLa, an input terminal thereof is connected to the data line DL, and an output terminal thereof is connected to the liquid crystal capacitor Clca and the storage capacitor Csta. A control terminal of the switching element Qb is connected to the gate line GLb, an input terminal thereof is connected to the data line DL, and an output terminal thereof is connected to the liquid crystal capacitor Clcb and the storage capacitor Cstb.

Each of the storage capacitors Csta and Cstb, serving as auxiliary members of the liquid crystal capacitors Clca and Clcb, respectively, is composed of a storage electrode line SL provided on the lower panel 100, the pixel electrode PX, and an insulator interposed therebetween, all provided on lower panel 100. A predetermined voltage, such as a common voltage Vcom, is applied to the storage electrode line SL. Alternatively, the storage capacitor Csta may be a laminated structure of the sub-pixel electrode PXa, the insulator, and a previous gate line formed on the insulator, and the storage capacitor Cstb may be a laminated structure of the sub-pixel electrode PXb, the insulator, and a previous gate line formed on the insulator.

Since the liquid crystal capacitors Clca and Clcb have been described, a detail description thereof will be omitted.

In the liquid crystal display including a liquid crystal panel assembly, signal controller 600 may receive input image signals R, G, and B, convert the input image signals into output image signals DAT for two sub-pixels PXa and PXb, and transmit the output image signals DAT to data driver 500. Alternatively, gray voltage generator 800 may generate separate gray voltage groups for the two sub-pixels PXa and PXb. Then, gray voltage generator 800 may alternately provide the gray voltage groups to data driver 500, or data driver 500 may alternately select the gray voltage groups, thereby applying different voltages to the sub-pixels PXa and PXb. In this case, it is preferable to correct the image signal or to generate the gray voltage groups such that the synthesized gamma curve of the gamma curves of the two sub-pixels PXa and PXb approaches a reference gamma curve of a front view. For example, the synthesized gamma curve of a front view coincides with the reference gamma curve of a front view most suitable for the liquid crystal panel assembly, and the synthesized gamma curve of a side view (e.g., a sideward view) is most similar to the reference gamma curve of a front view.

An example of the liquid crystal panel assembly shown in FIG. 11 will be described with reference to FIGS. 12 and 13.

Figure 12:
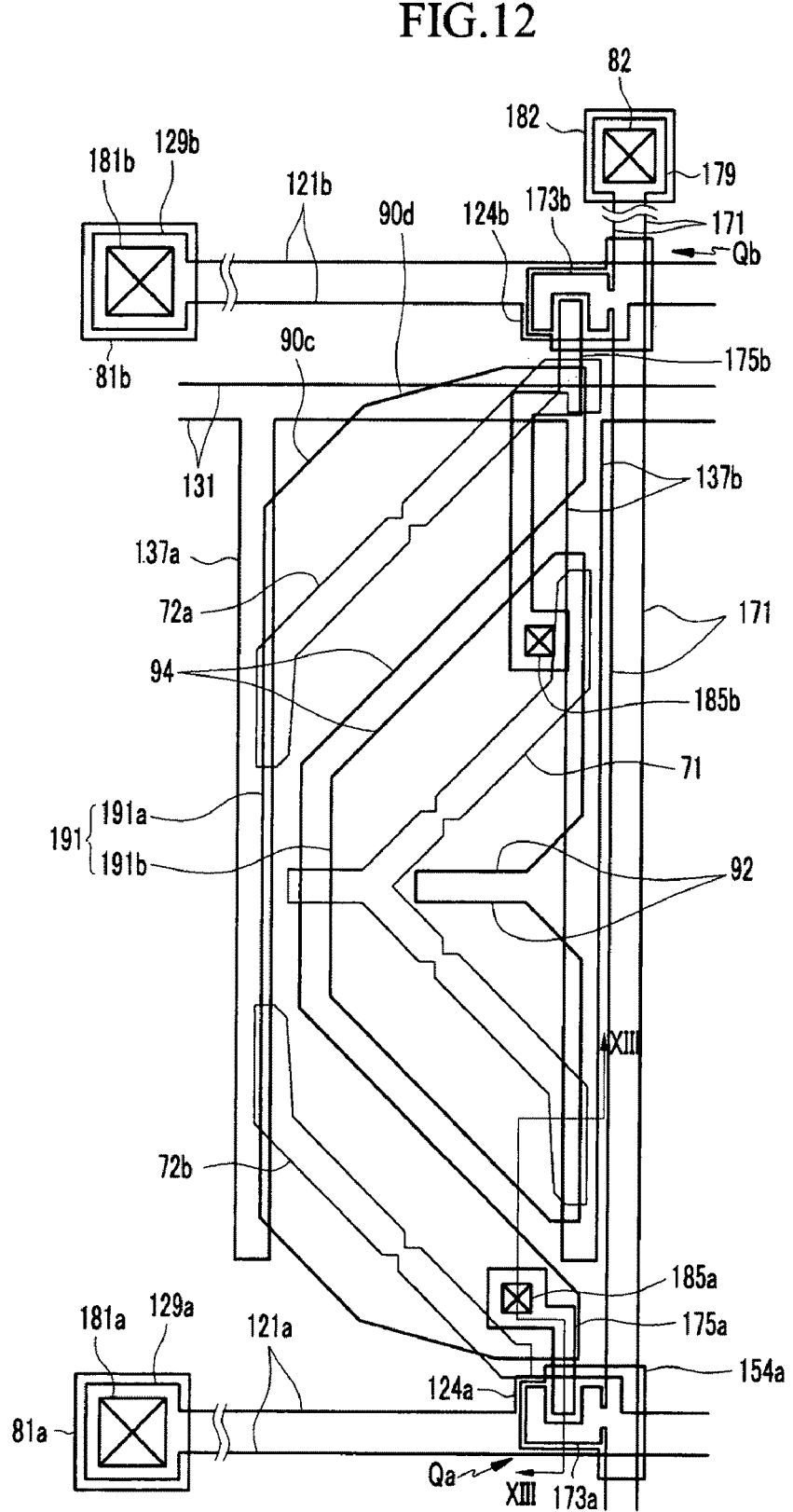
FIG. 12 is a view illustrating the layout of a liquid crystal panel assembly according to an embodiment of the present invention.
Figure 13:
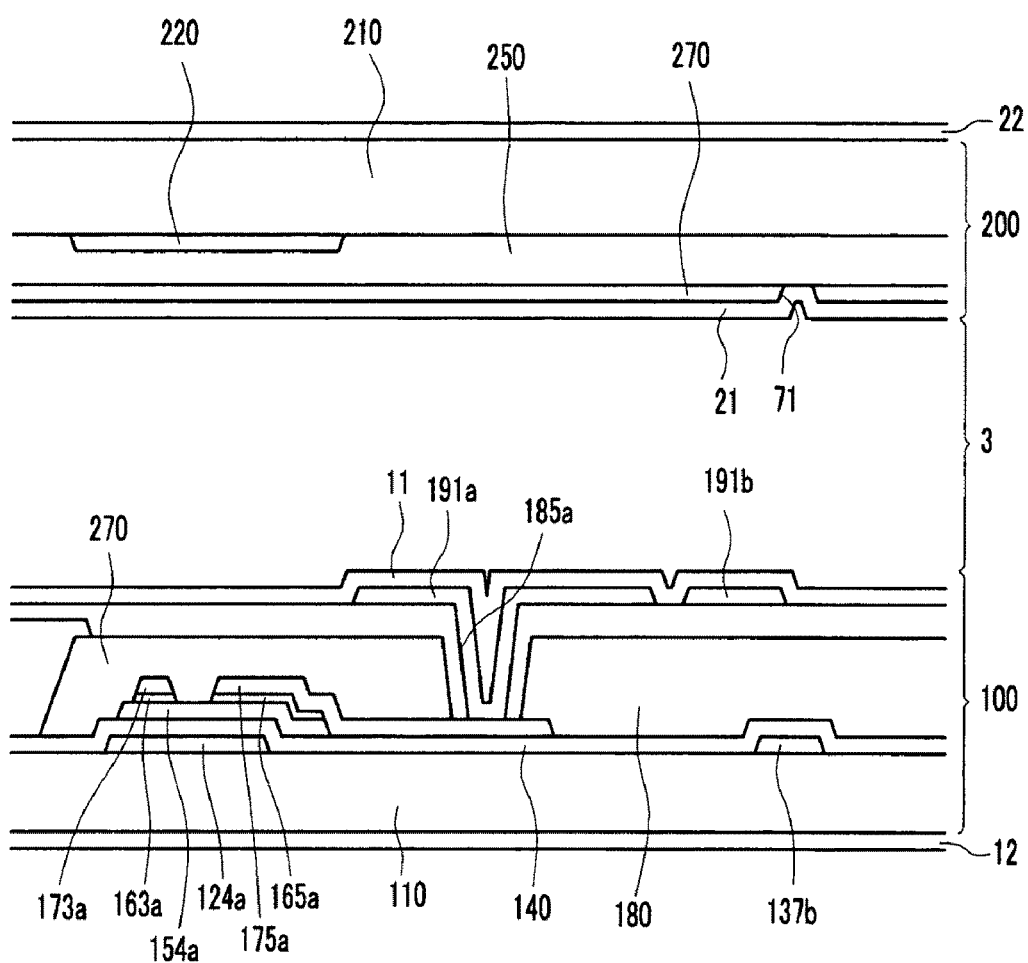
FIG. 13 is a cross-sectional view of the liquid crystal panel assembly shown in FIG. 12, taken along the line XIII-XIII.

FIG. 12 is a view illustrating the layout of a liquid crystal panel assembly according to an embodiment of the invention, and FIG. 13 is a cross-sectional view of the liquid crystal panel assembly shown in FIG. 12 as taken along the line XIII-XIII.

The liquid crystal panel assembly according to an embodiment shown in FIGS. 12 and 13, also includes lower panel 100, upper panel 200 facing lower panel 100, and liquid crystal layer 3 interposed therebetween.

The layered structure of the liquid crystal panel assembly according to this embodiment is substantially the same as the liquid crystal panel assembly shown in FIGS. 3 to 5.

Now, the lower panel 100 will be described with reference to FIGS. 12 and 13. In lower panel 100, a plurality of gate conductors including a plurality of pairs of first and second gate lines 121*a* and 121*b* and a plurality of storage electrode lines 131 are formed on insulating substrate 110. First gate line 121*a* has a first gate electrode 124*a* and an end portion 129*a*, and a second gate line 121*b* has a second gate electrode 124*b* and an end portion 129*b*. Storage electrode line 131 includes storage electrodes 137*a* and 137*b*. Gate insulating layer 140 is formed on gate lines 121*a*, 121*b*, and storage electrode line 131. A first and second island-shaped semiconductors 154*a* and 154*b* are formed on gate insulating layer 140, and a plurality of ohmic contacts 163*a* and 165*a* are formed thereon. A plurality of data conductors, including a plurality of data lines 171 and a plurality of pairs of first and second drain electrodes 175*a* and 175*b*, are formed on ohmic contacts 163*a* and 165*a* and gate insulating layer 140. Data line 171 includes a plurality of pairs of first and second source electrodes 173*a* and 173*b*, and end portion 179. Passivation layer 180 is formed on data conductors 171, 175*a*, and 175*b* and exposed portions of semiconductors 154*a* and 154*b*, and a plurality of contact holes 181*a*, 181*b*, 182, 185*a*, and 185*b* are formed in passivation layer 180 and gate insulating layer 140. A plurality of pixel electrodes 191 and a plurality of contact assistants 81*a*, 81*b*, and 82 are formed on passivation layer 180. An alignment layer 11 is formed on pixel electrodes 191, contact assistants 81*a*, 81*b*, and 82, and passivation layer 180.

Now, the upper panel of the liquid crystal panel assembly according to this embodiment shown in FIGS. 12 and 13 will be described. In the upper panel, light blocking member 220, overcoat 250, common electrode 270, and alignment layer 21 are sequentially formed on insulating substrate 210.

In the liquid crystal panel assembly according to the embodiment shown in FIGS. 12 and 13, each pixel electrode 191 is divided into a pair of first and second sub-pixel electrodes 191a and 191b, separated from each other, unlike the liquid crystal panel assembly shown in FIGS. 3 to 5. First and second sub-pixel electrodes 191a and 191b are separated from each other by a gap 94. Gap 94 includes an oblique portion parallel with first oblique side 90c.

Second sub-pixel electrode 191b includes central cutout 92. First sub-pixel electrode 191a is adjacent to first and second gate lines 121a and 121b, and includes first oblique side 90c and second oblique side 90d. First oblique side 90c and second oblique side 90d are the same as those of the liquid crystar panel assembly shown in FIG. 3, and thus a detailed description thereof will be omitted.

Different voltages that are predetermined for one input image signal are applied to one pair of sub-pixel electrodes 191a and 191b, and the levels of the voltages may be determined according to the sizes and shapes of sub-pixel electrodes 191a and 191b. Sub-pixel electrodes 191a and 191b may have different areas. For example, a higher voltage may be applied to second sub-pixel electrode 191b as compared to first sub-pixel electrode 191a, and the area of second sub-pixel electrode 191b may be larger than that of first sub-pixel electrode 191a.

The tilt angles of the liquid crystal molecules are changed according to the strength of an applied electric field. Therefore, since the voltages of the two liquid crystal capacitors Clca and Clcb are different from each other, the tilt angles of the liquid crystal molecules in the two sub-pixels are different from each other and thus the luminances of the two sub-pixels are different from each other. Therefore, when the voltages of the first and second liquid crystal capacitors Clca and Clcb are appropriately adjusted, it is possible to make an image viewed from a sideward view to appear similar as possible to an image viewed from the front, that is, to make the gamma curve of the sideward view be as similar as possible to the gamma curve of the front view. In this way, it is possible to improve the visibility (e.g., over a wider viewing angle).

When the area of first sub-pixel electrode 191a to which a high voltage is applied is set to be smaller than the area of second sub-pixel electrode 191b, it is possible to make the gamma curve of the sideward view further similar to the gamma curve of the front view. In particular, if the area ratio between first and second sub-pixel electrodes 191a and 191b is about 1:2 to 1:3, the gamma curve of the sideward view becomes further similar to the gamma curve of the front view and thus the sideward visibility is further improved.

The direction of a secondary electric field generated by the difference between the voltages of sub-pixel electrodes 191a and 191b is longitudinal to the main side of a partition. Therefore, the direction of the secondary electric field coincides with the direction of the transverse component of the primary electric field. Also, the secondary electric field between sub-pixel electrodes 191a and 191b assists in determining the tilt directions of the liquid crystal molecules.

The liquid crystal panel assembly shown in FIGS. 12 and 13 includes two gate lines, that is, first and second gate lines 121a and 121b, two gate electrodes, that is, first and second gate electrodes 124a and 124b, two island-shaped semiconductors, that is, first and second island-shaped semiconductors 154a and 154b, two source electrodes, that is, first and second source electrodes 173a and 173b, and two drain electrodes, that is, first and second drain electrode 175a and 175b, unlike the liquid crystal panel assembly shown in FIGS. 3 to 6.

First gate electrode 124a, first source electrode 173a, and first drain electrode 175a form a first TFT Qa together with first semiconductor 154a, and the channel of the first TFT Qa is formed in first semiconductor 154a between first source electrode 173a and first drain electrode 175a. Second gate electrode 124b, second source electrode 173b, and second drain electrode 175b form a second TFT Qb together with second semiconductor 154b, and the channel of the second TFT Qb is formed in second semiconductor 154b between second source electrode 173b and second drain electrode 175b.

Further, in the liquid crystal panel assembly according to this embodiment, no color filter exists in upper panel 200, and a plurality of color filters 230 are formed underneath passivation layer 180 of lower panel 100, unlike the liquid crystal panel assembly shown in FIGS. 3 to 5.

Color filter 230 extends along a column of pixel electrodes 191 while being regularly bent, and does not exist in a peripheral area where end portion 129 of the gate line 121 and end portion 179 of data line 171 are positioned. Contact hole 185a passes through color filter 230, and a through hole having a larger diameter than the contact hole 185a is formed in color filter 230.

Neighboring color filters 230 may overlap each other on data line 171 to serve as a light blocking member for preventing light leakage between neighboring pixel electrodes 191. In this case, the light blocking member of upper panel 200 will be omitted and thus the manufacturing process is simplified.

A passivation layer (not shown) may be provided underneath color filters 230.

Overcoat 250 of upper panel 200 may be omitted.

Many characteristics of the liquid crystal panel assembly shown in FIGS. 3 to 6 can be applied to the liquid crystal panel assembly shown in FIGS. 12 and 13.

Next, another example of a liquid crystal panel assembly shown in FIG. 10 will be described with reference to FIGS. 14 to 16.

Figure 14:
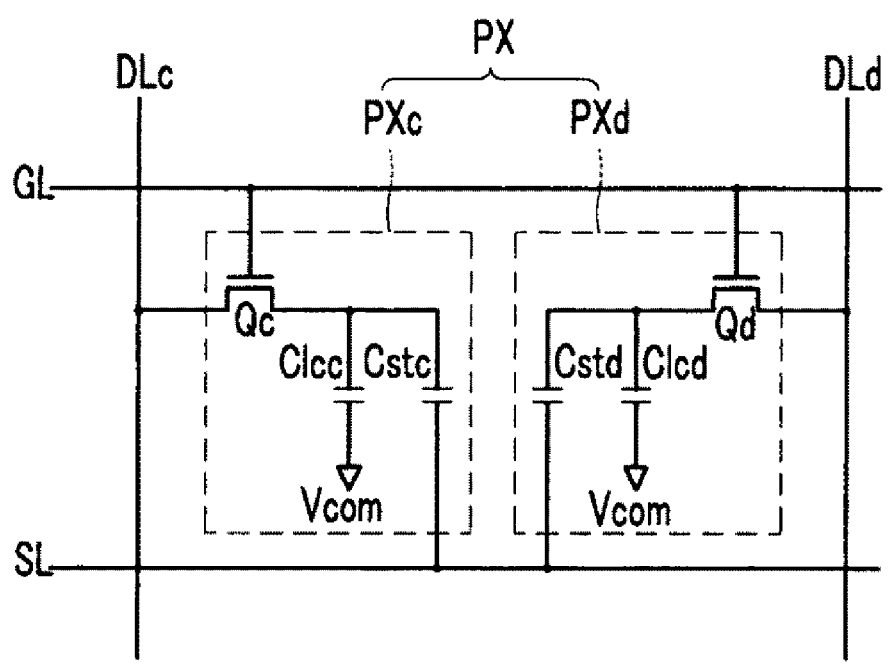
FIG. 14 is an equivalent circuit diagram of one pixel of a liquid crystal panel assembly according to an embodiment of the present invention.

FIG. 14 is an equivalent circuit diagram of one pixel of a liquid crystal panel assembly according to an embodiment of the invention.

Referring to FIG. 14, the liquid crystal panel assembly according to this embodiment includes a plurality of signal lines, including a plurality of gate lines GL, a plurality of pairs of data lines DLc and DLd, and a plurality of storage electrode lines SL, and a plurality of pixels PX connected to the signal lines.

Each pixel PX includes a pair of sub-pixels PXc and PXd. The sub-pixel PXc includes a switching element Qc connected to a corresponding gate line GL and a data line DLc, the liquid crystal capacitor Clcc connected to the switching element Qc, and a storage capacitor Cstc connected to the switching element Qc and a storage electrode line SL. The sub-pixel PXd includes a switching element Qd connected to the corresponding gate line GL and the data line DLd, the liquid crystal capacitor Clcd connected to the switching element Qd, and a storage capacitor Cstd connected to the switching element Qd and the storage electrode line SL.

Each of the switching elements Qc and Qd is a three-terminal element, such as a thin film transistor, provided on lower panel 100. A control terminal of the switching element Qc is connected to the gate line GL, an input terminal thereof is connected to the data line DLc, and an output terminal thereof is connected to the liquid crystal capacitor Clcc and the storage capacitor Cstc. A control terminal of the switching element Qd is connected to the gate line GL, an input terminal thereof is connected to the data line DLd, and an output terminal thereof is connected to the liquid crystal capacitor Clcd and the storage capacitor Cstd.

The operation of a liquid crystal display including the liquid crystal capacitors Clcc and Clcd, the storage capacitors Cstc and Cstd, and the liquid crystal panel assembly is substantially the same as the previous embodiment and thus a detailed description thereof will be omitted. However, in this embodiment, data voltages are applied to two sub-pixels PXc and PXd forming one pixel PX at the same time, unlike the liquid crystal panel assembly shown in FIG. 12 in which data voltages are applied to the two sub-pixels PXa and PXa forming one pixel PX with a time interval.

Now, an example of the liquid crystal panel assembly shown in FIG. 14 will be described with reference to FIGS. 15 to 17.

Figure 15:
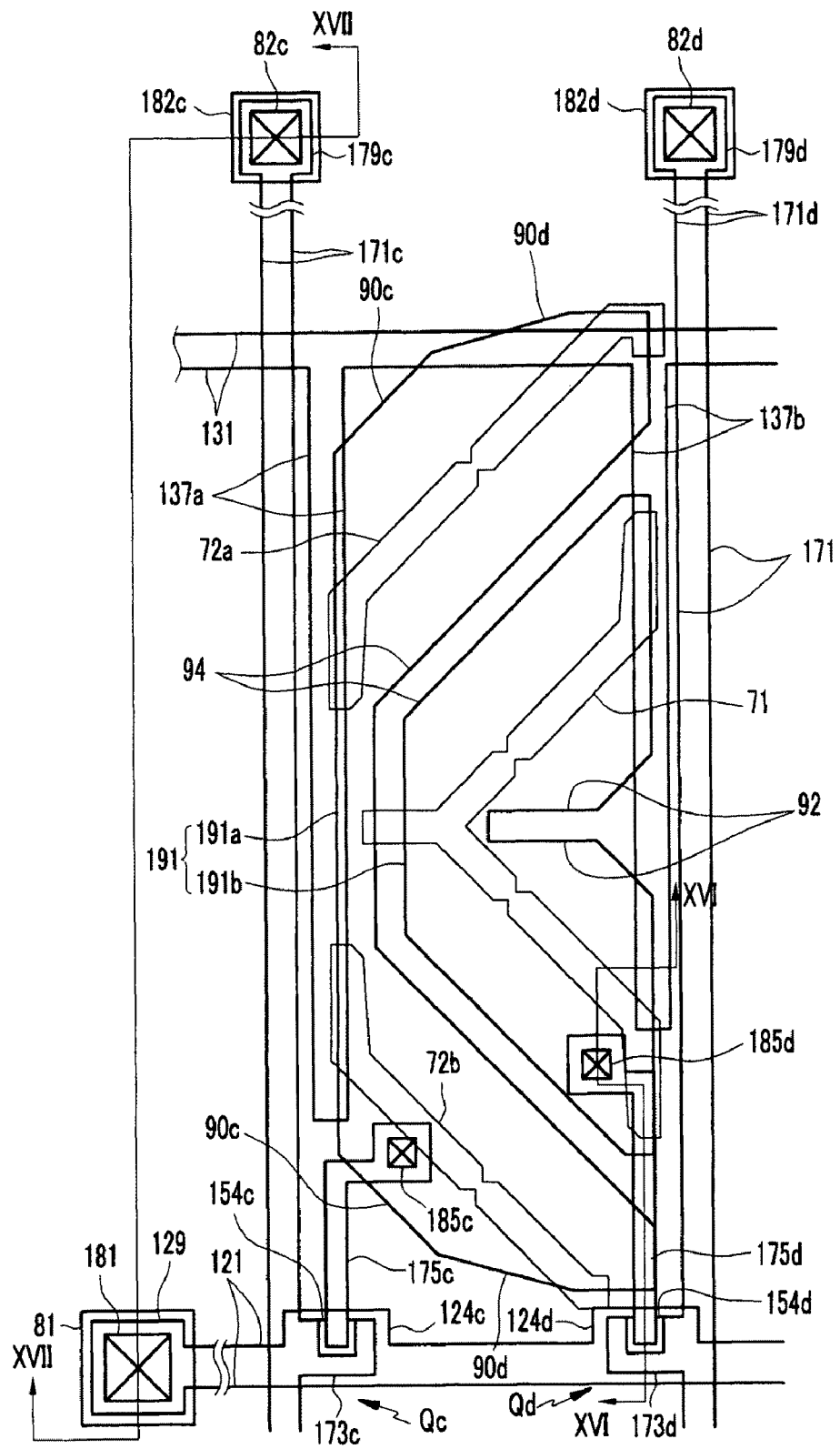
FIG. 15 is a view illustrating the layout of a liquid crystal panel assembly according to an embodiment of the present invention.

FIG. 15 is a view illustrating the layout of a liquid crystal panel assembly according to another embodiment of the present invention. FIGS. 16 and 17 are cross-sectional views of the liquid crystal panel assembly shown in FIG. 15 as taken along the lines XVI-XVI and XVII-XVII, respectively.

Figure 16:
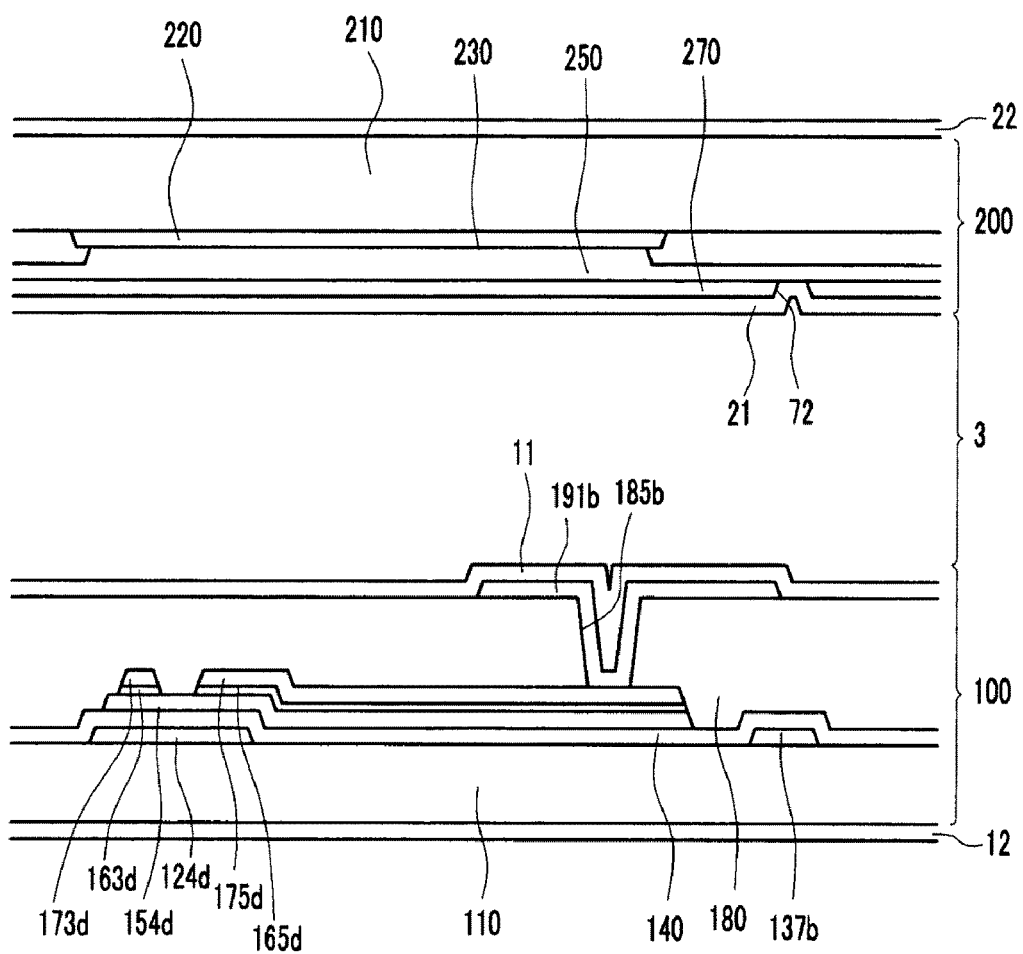
FIGS. 16 and 17 are cross-sectional views of the liquid crystal panel assembly shown in FIG. 15, taken along the lines XVI-XVI and XVII-XVII, respectively.
Figure 17:
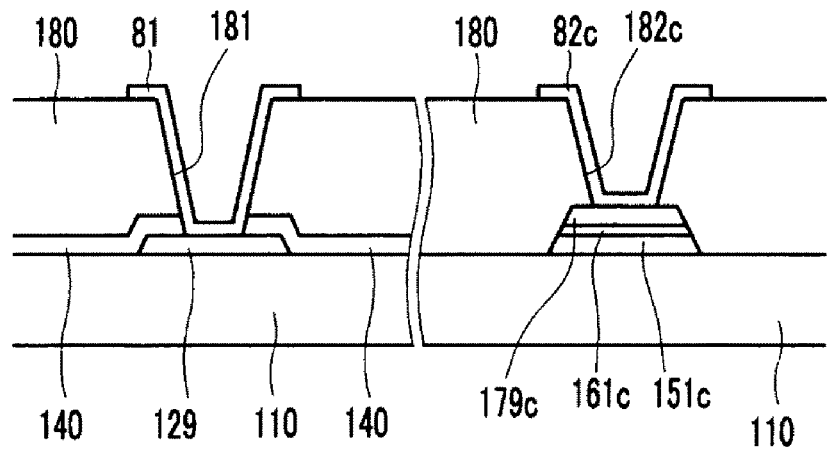

As shown in FIGS. 15 to 17, the liquid crystal panel assembly according to this embodiment includes lower panel 100, upper panel 200 facing lower panel 100, liquid crystal layer 3 interposed therebetween, and a pair of polarizers 12 and 22 attached to the outer surfaces of the lower and upper panels.

The layered structure of the liquid crystal panel assembly according to the embodiment shown in FIGS. 15 to 17 is substantially the same as the layered structure of the liquid crystal panel assembly shown in FIGS. 3 to 5.

The lower panel of the liquid crystal panel assembly according to this embodiment shown in FIG. 15 will be described. In lower panel 100, a plurality of gate conductors, including a plurality of gate lines 121 and a plurality of storage electrode lines 131, are formed on insulating substrate 110. Each gate line 121 has a plurality of pairs of first and second gate electrodes 124a and 124d and end portion 129. Each storage electrode line 131 includes storage electrodes 137a and 137b. Gate insulating layer 140 is formed on gate lines 121. First and second island-shaped semiconductors 154c and 154d are formed on gate insulating layer 140, and a plurality of ohmic contacts 163c and 163d are formed thereon. A plurality of data conductors, including a plurality of pairs of data lines 171c and 171d and a plurality of pairs of first and second drain electrodes 175c and 175d, are formed on ohmic contacts 163c and 163d. First data line 171c includes a plurality of source electrodes 173c and an end portion 179a, and second data line 171d includes a plurality of source electrodes 173d and an end portion 179b. Passivation layer 180 is formed on data lines 171c, 171d, 175c, and 175d and exposed portions of semiconductors 154c and 154d, and a plurality of contact holes 181, 182c, 182d, 185c, and 185d are formed in passivation layer 180 and gate insulating layer 140. A plurality of pixel electrodes 191 and a plurality of contact assistants 81, 82c, and 82d are formed on passivation layer 180, and each of pixel electrodes 191 includes first and second sub-pixel electrodes 191a and 191b. Alignment layer 11 is formed on pixel electrodes 191, contact assistants 81, 82c, and 82d, and passivation layer 180.

Upper panel 200 of the liquid crystal panel assembly according to this embodiment shown in FIGS. 15 and 16 will be described. In upper panel 200, light blocking member 220, a plurality of color filters 230, overcoat 250, common electrode 270, and alignment layer 21 are sequentially formed on insulating substrate 210.

In the liquid crystal panel assembly shown in FIG. 15, the number of gate lines 121 is half, and the number of data lines 171c and 171d is twice, as compared to the liquid crystal panel assembly shown in FIGS. 12 and 13. Further, the first and second thin film transistors Qc and Qd, connected to first and second sub-pixel electrodes 191a and 191b forming one pixel electrode 191, are connected to the same gate line 121 and to different data lines 171c and 171d.

Furthermore, semiconductors 154c and 154d extend along data lines 171c and 171d and drain electrodes 175c and 175d to form a linear semiconductor 151, and ohmic contact 163d extends along data lines 171c and 171d to form a linear ohmic contact 161. Linear semiconductor 151 has substantially the same planar shape as data line 171, drain electrodes 175c and 175d, and ohmic contacts 161 and 165d provided to the lower side thereof.

In a method of manufacturing such a TFT panel according to an embodiment of the present invention, data lines 171c and 171d, drain electrodes 175c and 175d, semiconductors 151, and ohmic contacts 161 and 165b are formed by one photolithographic process.

The thickness of a photosensitive film used in the photolithographic process varies according to position, and the photosensitive film includes a first portion and a second portion in a decreasing order of thickness of the film. The first portion is positioned in a wiring region that data lines 171c and 171d and drain electrodes 175c and 175d occupy, and the second portion is positioned in a channel region of a TFT.

There are various methods of making the thickness of a photosensitive film different according to position, for example a method of providing a translucent area as well as a light transmitting area and a light blocking area to an optical mask. In the translucent area, a slit pattern, a lattice pattern, or a thin film having intermediate transmittance or an intermediate thickness is provided. When a slit pattern is used, it is preferable that the width of a slit or the interval between slits is less than the resolution of an exposure apparatus used in a photolithographic process. Another example is to use a reflowable photosensitive film. More specifically, after a photosensitive film is formed of a reflowable material by using a normal exposure mask with only transparent areas and light blocking areas, it is subjected to a reflow process to flow onto areas without the photosensitive film, thereby forming a thinned layer portion.

As a result, one photolithographic process can be omitted and thus the manufacturing process is simplified.

Many features of the liquid crystal panel assembly shown in FIGS. 3 to 5 may be applied to the liquid crystal panel assembly shown in FIGS. 15 and 16.

Now, a liquid crystal panel assembly according to an embodiment of the present invention will be described with reference to FIGS. 18 and 19.

Figure 18:
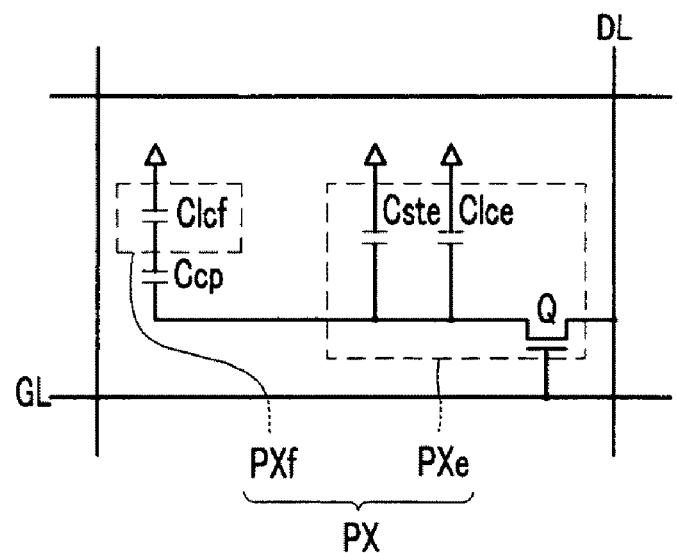
FIG. 18 is an equivalent circuit diagram of one pixel of a liquid crystal panel assembly according to an embodiment of the present invention.

FIG. 18 is an equivalent circuit diagram of one pixel of a liquid crystal panel assembly according to this embodiment of the invention.

Referring to FIG. 18, the liquid crystal panel assembly according to this embodiment includes a plurality of signal lines, including a plurality of gate lines GL and a plurality of data lines DL, and a plurality of pixels PX connected to the signal lines.

Each pixel PX includes a pair of first and second sub-pixels PXe and PXf, and a coupling capacitor Ccp connected between the first and second sub-pixels PXe and PXf.

The first sub-pixel PXe includes a switching element Q connected to a gate line GL and a data line DL, a first liquid crystal capacitor Clce and a storage capacitor Cste connected to the switching element Q, and the second sub-pixel PXf includes a coupling capacitor Ccp and a second liquid crystal capacitor Clcf connected to each other.

Each switching element Q is a three-terminal element, such as a thin film transistor, provided on lower panel 100. A control terminal of the switching element Q is connected to the gate line GL, an input terminal thereof is connected to the data line DL, and an output terminal thereof is connected to the liquid crystal capacitor Clce, the storage capacitor Cste, and the coupling capacitor Ccp.

The switching element Q applies a data voltage from the data line DL to the first liquid crystal capacitor Clce and the coupling capacitor Ccp on the basis of a gate signal from the gate line GL, and the coupling capacitor Ccp changes the level of the data voltage and transmits the changed voltage to the second liquid crystal capacitor Clcf.

Assuming that a common voltage Vcom is applied to the storage capacitor Cste and the capacitance of each of the capacitors Clce, Cste, Clcf, and Ccp is denoted by the same reference symbol as the corresponding capacitor, the voltage Ve charged to the first liquid crystal capacitor Clce and the voltage Vf charged to the second liquid crystal capacitor Clcf have the following relationship.

$$Vf=Vex[Ccp/(Ccp+Clcf)]$$

Since the value of Ccp/(Ccp+Clcf) is less than 1, the voltage Vf charged to the second liquid crystal capacitor Clcf is always lower than the voltage Ve charged to the first liquid crystal capacitor Clce. This relationship is established even when the voltage applied to the storage capacitor Cste is not the common voltage Vcom.

An appropriate ratio of the voltage Ve of the first liquid crystal capacitor Clce to the voltage Vf of the second liquid crystal capacitor Clcf can be obtained by adjusting the capacitance of the coupling capacitor Ccp.

Now, an example of a liquid crystal panel assembly according to an embodiment of the present invention will be described with reference to FIG. 19.

Figure 19:
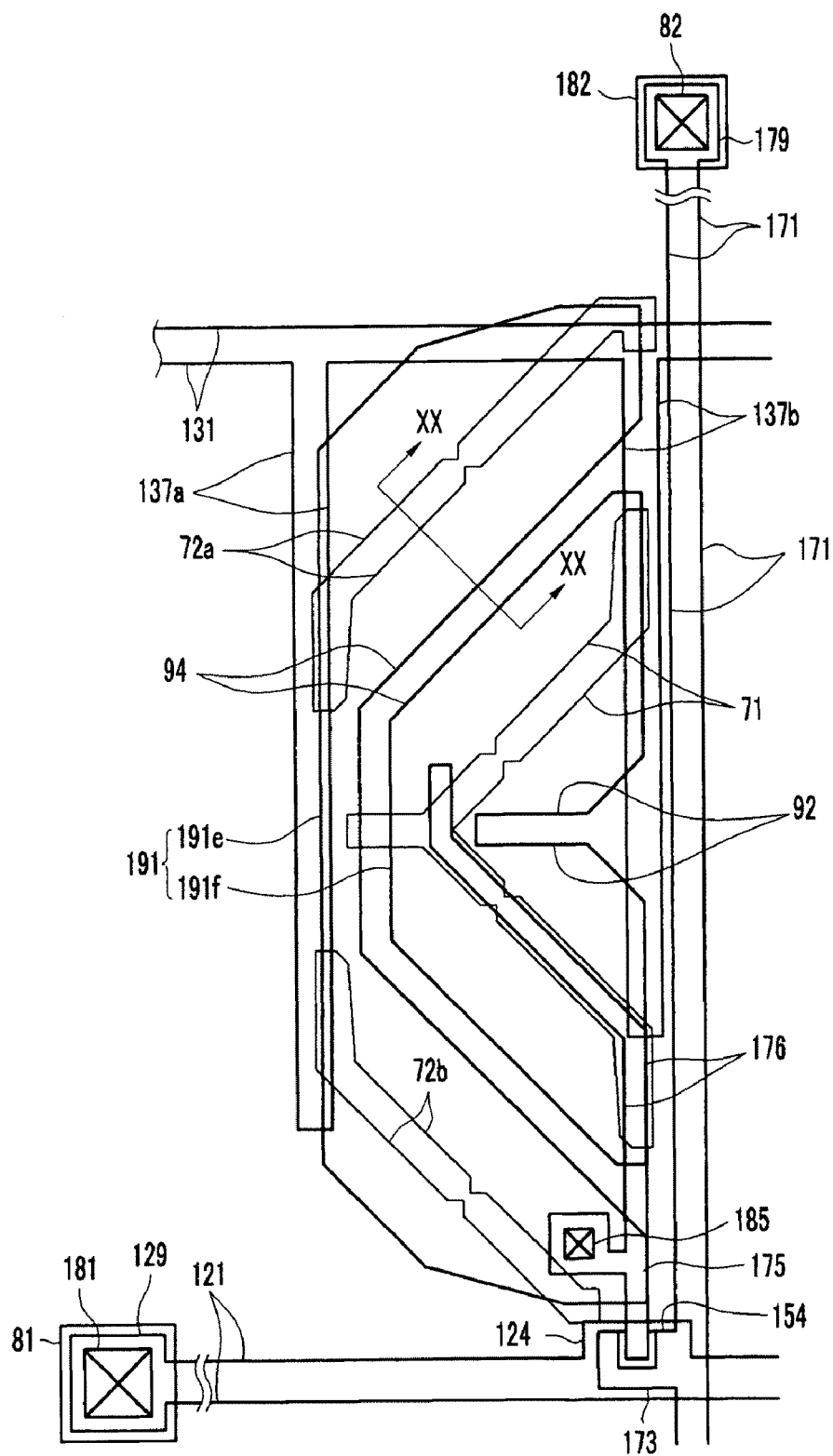
FIG. 19 is a view illustrating the layout of a liquid crystal panel assembly according to an embodiment of the present invention.
Figure 20:
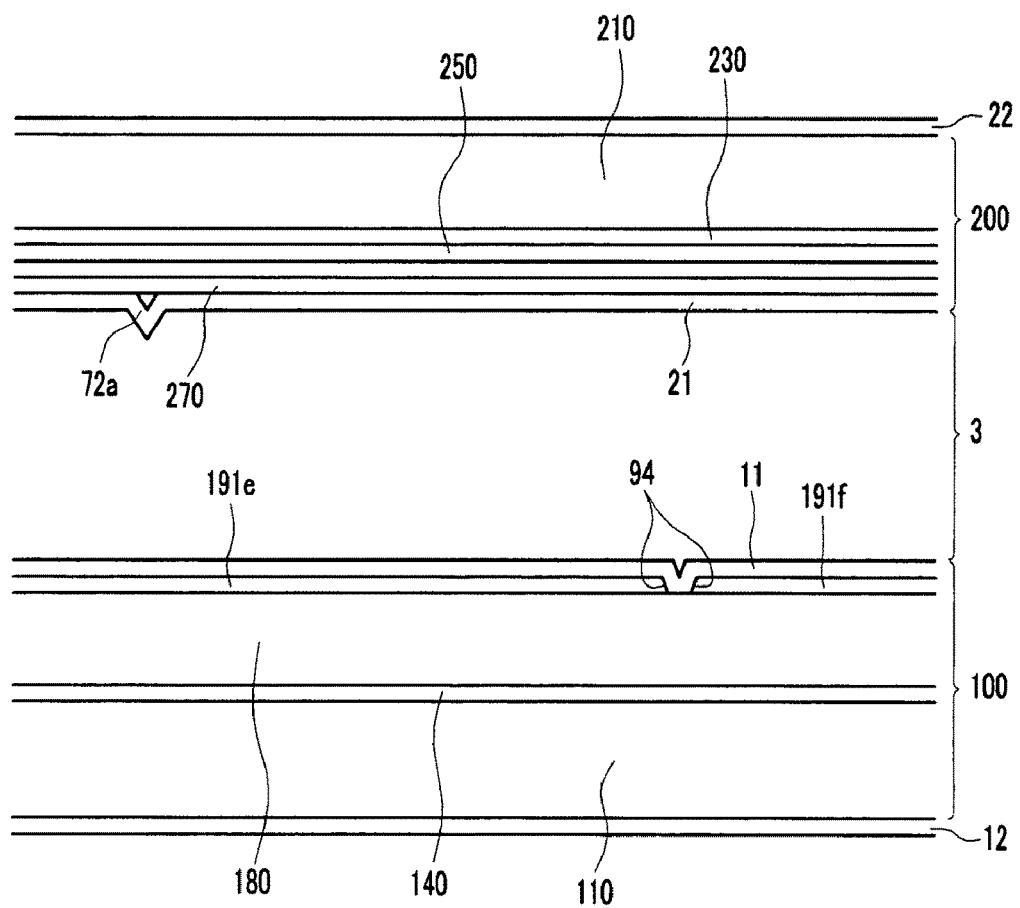
FIG. 20 is cross-sectional view of the liquid crystal panel assembly shown in FIG. 19, taken along the line XX-XX.

FIG. 19 is a view illustrating the layout of a liquid crystal panel assembly according to an embodiment of the invention and FIG. 20 is a cross-sectional view of the liquid crystal panel assembly shown in FIG. 19, taken along the line XX-XX. The layered structure of the liquid crystal panel assembly according to this embodiment is substantially the same as the liquid crystal panel assemblies shown in FIGS. 3-5, 13, and 16 and thus is not shown separately. In FIG. 19, the same components as those shown in FIGS. 4, 13, and 16 are denoted by the same reference numerals.

Referring to FIG. 19, the liquid crystal panel assembly according to this embodiment also includes a lower panel 100, an upper panel 200 facing the lower panel 100, and a liquid crystal layer 3 interposed between the lower and upper panels.

The layered structure of the liquid crystal panel assembly according to this embodiment is substantially the same as the liquid crystal panel assembly shown in FIGS. 3 to 5.

In lower panel 100, a plurality of gate conductors including a plurality of gate lines 121 are formed on an insulating substrate 110. Each gate line 121 includes a plurality of gate electrodes 124 and end portion 129. A gate insulating layer 140 is formed on gate conductors 121. A plurality of island-shaped semiconductors 154 are formed on gate insulating layer, and a plurality of ohmic contacts (not shown) are formed thereon. A plurality of data conductors, including a plurality of data lines 171 and a plurality of drain electrodes 175, are formed on the ohmic contacts and the gate insulating layer. Data line 171 includes a plurality of source electrodes 173 and end portion 179. A passivation layer 180 is formed on data conductors 171 and 175a and exposed portions of semiconductors 154, and a plurality of contact holes 181, 182, and 185 are formed in the passivation layer and the gate insulating layer. A plurality of pixel electrodes 191 and a plurality of contact assistants 81 and 82 are formed on the passivation layer. An alignment layer 11 is formed on pixel electrodes 191, contact assistants 81 and 82, and the passivation layer.

In the upper panel, a light blocking member (not shown), a plurality of color filters 230, an overcoat 250, a common electrode 270, and an alignment layer 21 are sequentially formed on an insulating substrate 210.

In this embodiment, a protrusion 72a and 72b is formed on common electrode 270. The protrusion 72a and 72b distorted the electric field to make a transverse component of a primary electric field. Thus the tilt directions of the liquid crystal molecules are diversified, the reference viewing angle of the liquid crystal display is increased.

In this embodiment, pixel electrode 191 and common electrode 270 are similar to those of the liquid crystal panel assembly shown in FIGS. 12 and 15. However, in this embodiment, pixel electrode 191 includes first and second sub-pixel electrodes 191a and 191b that are separated from each other, unlike pixel electrode 191 shown in FIG. 3. First sub-pixel electrode 191a is connected to drain electrode 175 through contact hole 185.

In the liquid crystal panel assembly according to this embodiment, drain electrode 175 includes a coupling electrode 176. Coupling electrode 176 extends substantially parallel with data line 171 and extends along the oblique portion and the longitudinal portion of central cutout 71 of common electrode 270.

Coupling electrode 176 overlaps second sub-pixel electrode 191b. Coupling electrode 176 and second sub-pixel electrode 191b form a coupling capacitor Ccp.

Many features of the liquid crystal panel assembly shown in FIGS. 15 to 17 can be applied to the liquid crystal panel assembly shown in FIG. 19.

According to the embodiments of the present invention, texture generation of the liquid crystal molecule is prevented such that the transmittance is raised and the response speed of a liquid crystal display is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
a substrate;
a gate line formed on the substrate;
a data line formed on the substrate so as to intersect the gate lines; and
a pixel electrode formed on the substrate,
wherein a periphery of the pixel electrode comprises:
a first main edge substantially parallel with the gate line,
a second main edge substantially parallel with the data line,
a first oblique edge making a first oblique angle with respect to the first and second main sides, and
a second oblique edge making a second oblique angle with respect to the first and second main sides, and the first oblique angle and the second oblique angle are different from each other, wherein the first oblique edge and the second oblique edge are disposed adjacent to the gate line, and wherein the first main edge, the second oblique edge, the first oblique edge, and the second main edge are sequentially adjacent to one another and continuously extend to form a portion of the periphery of the pixel electrode, and the pixel electrode further comprises a first tilt direction determining member and the first tilt direction determining member has a side parallel with the first oblique edge.

2. The liquid crystal display of claim 1,
wherein an angle formed between the first main edge and the second oblique edge is in a range of 0° to 45°, and
an angle formed between the second oblique edge and the first oblique edge is in a range of 0° to 45°.

3. The liquid crystal display of claim 1, further comprising a common electrode facing the pixel electrode,
wherein the common electrode has second tilt direction determining member.

4. The liquid crystal display of claim 3, wherein the second tilt direction determining member comprises a first cutout formed substantially parallel with the first oblique edge or a first protrusion formed substantially parallel with the first oblique edge.

5. The liquid crystal display of claim 1, wherein the first tilt direction determining member comprises a second cutout formed substantially parallel with the first oblique edge or a second protrusion formed substantially parallel with the first oblique edge.

6. The liquid crystal display of claim 1, further comprising a storage electrode line intersecting at least a part of the second oblique edge.

7. The liquid crystal display of claim 1, wherein each pixel electrode comprises a first sub-pixel electrode and a second sub-pixel electrode separated from each other by a gap.

8. The liquid crystal display of claim 7, wherein the gap comprises an oblique portion parallel with the first oblique edge.

9. The liquid crystal display of claim 7, further comprising a common electrode facing the pixel electrodes,
wherein the common electrode has a second tilt direction determining member.

10. The liquid crystal display of claim 9, wherein the second tilt direction determining member comprises a first cut-out formed substantially parallel with the first oblique edge or a first protrusion formed substantially parallel with the first oblique edge.

11. The liquid crystal display of claim 1, wherein the first tilt direction determining member comprises a second cutout formed substantially parallel with the first oblique edge or a second protrusion formed substantially parallel with the first oblique edge.

* * * * *